US012066258B2

(12) United States Patent
Al Alili et al.

(10) Patent No.: US 12,066,258 B2
(45) Date of Patent: Aug. 20, 2024

(54) WATER DROPLETS COLLECTION DEVICE FROM AIRFLOW USING ELECTROSTATIC SEPARATORS

(71) Applicant: Khalifa University of Science and Technology, Abu Dhabi (AE)

(72) Inventors: Ali Rashed Al Alili, Abu Dhabi (AE); Mohamed Saeed Alshehhi, Abu Dhabi (AE); Wang Chaofan, Cecun (CN)

(73) Assignee: Khalifa University of Science and Technology, Abu Dhabi (AE)

( * ) Notice: Subject to any disclaimer, the term of this patent is extended or adjusted under 35 U.S.C. 154(b) by 503 days.

(21) Appl. No.: 17/428,237

(22) PCT Filed: Feb. 4, 2020

(86) PCT No.: PCT/IB2020/050863
§ 371 (c)(1),
(2) Date: Aug. 3, 2021

(87) PCT Pub. No.: WO2020/161611
PCT Pub. Date: Aug. 13, 2020

(65) Prior Publication Data

US 2021/0389063 A1 Dec. 16, 2021

Related U.S. Application Data

(60) Provisional application No. 62/801,244, filed on Feb. 5, 2019.

(51) Int. Cl.
*F28F 25/02* (2006.01)
*B03C 3/017* (2006.01)
(Continued)

(52) U.S. Cl.
CPC .............. *F28F 25/02* (2013.01); *B03C 3/017* (2013.01); *B03C 3/16* (2013.01); *B03C 3/41* (2013.01);
(Continued)

(58) Field of Classification Search
CPC ... F28F 25/02; B03C 3/16; B03C 3/41; B03C 3/49; B03C 3/64; B03C 2201/10
See application file for complete search history.

(56) References Cited

U.S. PATENT DOCUMENTS

2016/0332895 A1 11/2016 Hench et al.

FOREIGN PATENT DOCUMENTS

CN 109954354 A 7/2019
DE 2313418 A1 9/1974
(Continued)

OTHER PUBLICATIONS

Machine translation of DE 202010005629 (Year: 2010).*
POT/IB2020/050863: International Search Report and Written Opinion; Mar. 30, 2020; 10 pages.

*Primary Examiner* — Robert Clemente
(74) *Attorney, Agent, or Firm* — Kilpatrick Townsend & Stockton LLP

(57) ABSTRACT

There is provided a system and method for collecting water droplets from an airflow of a cooling tower (8) through condensation of water vapour using an electrostatic separator (20), wherein the electrostatic separator is a single unit electrostatic separator (20) or a multi-unit electrostatic separator. The method for water particles collection from the exhaust airflow of a cooling tower primarily comprises condensing water vapour into large water droplets. It is experimentally proved that electrostatic separation solves the problem of visible plume pollution, and blow down decreased since collected water flows back to the circulating
(Continued)

water. Additionally, electrostatic separation results in small pressure drop of the cooling tower (8).

13 Claims, 25 Drawing Sheets

(51) Int. Cl.
*B03C 3/16* (2006.01)
*B03C 3/41* (2006.01)
*B03C 3/49* (2006.01)
*B03C 3/64* (2006.01)
*F28F 25/00* (2006.01)

(52) U.S. Cl.
CPC .................. *B03C 3/49* (2013.01); *B03C 3/64* (2013.01); *B03C 2201/10* (2013.01); *F28F 2025/005* (2013.01)

(56) References Cited

FOREIGN PATENT DOCUMENTS

| | | | | | |
|---|---|---|---|---|---|
| DE | 2547719 | A1 | | 4/1977 | |
| DE | 202010005629 | U1 | * | 12/2010 | ............... B03C 3/06 |
| EP | 2700452 | A2 | * | 2/2014 | ............... B03C 3/08 |
| GB | 1523142 | A | | 8/1978 | |
| GB | 2157818 | A | | 10/1985 | |
| IT | 1073299 | B | | 4/1985 | |
| WO | 2010110980 | A1 | | 9/2010 | |

* cited by examiner

1 --- WATER PUMP
2 --- HOT WATER TANK
3 --- WATER HEATER
4 --- VFD
5 --- WATER HEATER POWER SUPPLY
6 --- HIGH VOLTAGE POWER SUPPLY
7 --- CONICAL DUCT
8 --- COOLING TOWER
9 --- COOLING WATER PUMP
10 -- WATER BATH
11 -- WATER COLLECTION TANK
12 -- COMPRESSOR
13 -- DAQS
14 -- PC
15 -- MULTI-UNIT ELECTROSTATIC SEPARATOR
16 -- HUMIDITY AND TEMPERATURE SENSOR
17 -- GROUND CONNECTION WIRE
18 -- SPRAY NOZZLE
19 -- ACRYLIC PLATE (10MM)
20 -- SINGLE UNIT ELECTRO-STATIC SEPARATOR

WATER DROPLETS COLLECTION DEVICE FROM AIRFLOW USING ELECTROSTATIC SEPARATORS

FIELD OF THE INVENTION

The present invention relates to a solution for preventing water loss from wet cooling towers, and more particularly to a system and method for collecting water droplets using single-unit or multi-unit electrostatic separators.

BACKGROUND OF THE INVENTION

Many industrial processes generate heat which needs to be dissipated in order to ensure their efficient operation. Evaporative cooling is one of the most effective methods used for heat rejection. Industries such as oil refineries, thermal power stations and Heating Ventilation Air Conditioning (HVAC) systems for cooling buildings use a considerable amount of water annually from their heat rejection devices, most of lost water is consumed by the evaporation cooling process. The idea is to absorb the heat required to evaporate water from its surrounding environment, hence deceasing its temperature. A cooling tower is an effective heat rejection device widely used in many industries, while the consumed water by evaporation from cooling towers is large and so far there are almost no effective solutions for addressing this problem.

Considering the working principle of cooling towers, water which has been heated by an industrial process or in an air-conditioning condenser, is pumped to the cooling tower through pipes. The water sprays through nozzles onto banks of material called fill which slows the flow of water through the cooling tower, and exposes as much water surface area as possible for maximum air-water contact. As the water flows through the cooling tower, it is exposed to air, which is being pulled through the tower by the electric motor-driven fan. When the water and air meet, a small amount of water is evaporated, creating a cooling action. The cooled water is then pumped back to the condenser or process equipment where it absorbs heat. It will then be pumped back to the cooling tower to be cooled once again.

Electrohydrodynamics (EHD) is an effect way to collect small droplets from an airflow, which is widely applied in electrostatic precipitators. The diameter size of water droplets produced by evaporation is within micron and submicron range and the relative permittivity is about 81 which is considered very high compared to other liquids. Therefore, water particles can be charged easily and collected using the EHD. Furthermore, compared to other water collection methods, EHD causes small pressure drop which won't affect the cooling tower capacity. Moreover, EHD might remove hazardous chemical constituents, such as minerals, debris and microorganisms and water treatment chemicals, from the exhaust airflow of cooling towers and contribute to solve the white plume pollution problem. The limitation of the EHD is higher initial investment than other methods, mainly because of requiring power supply system for operation.

As an efficient heat rejection device, wet cooling towers use the evaporation of water to remove process heat and cool the working fluid to near the air wet-bulb temperature. In most cases they are responsible for the consumption of large volumes of potable water and can account for up to half of a building's or site's total water usage. For example, the water consumption rate in wet cooling towers of a world advanced closed loop power plant is about 1 $m^3/s$ per 100 MW capacity. The total water it uses is nearly equal to demand of a small or even a medium city. Besides, due to the exhaust gas (water vapor) in cooling tower being in saturated state, condensation occurs upon mixing with the ambient air when the temperature of water vapor reaches its dew point in cool and humid ambient environment.

With a large amount of water consumed in industrial processes, much attention has been given to water conservation. In terms of water saving in cooling towers, drift eliminators were designed to capture large water droplets caught in the cooling tower air stream by changing the direction of the droplets. After impacting on the blade walls, water droplets will fall back into the tower. However, inertial drift eliminators are ineffective in collecting droplets smaller than 200 μm. Besides, drift eliminators result in air side pressure drop which could negatively affect the cooling tower efficiency. Traditional methods explored the possibility of fog capture from a cooling tower plume. Different kinds of fog nets were used to capture the droplets from the exhausted airflow. The results showed that about 40% of the drift water loss could be recovered. Previous methods also investigated water consumption of cooling towers and found that water loss through evaporation accounted for 83% of total cooling towers water loss. A vapor recovery system consisting of a circular fiber filter on top of cooling towers was installed to absorb and condense water vapor that comes out of the cooling towers, and the experiment result showed that approximately 10% of evaporated water could be recovered using this method. Further, hollow fiber membrane filter modules were employed to recapture cooling water vapor and honeycomb, pleated or web-like fiber filters were also used to absorb water vapor coming out of cooling towers. However, the amount of water vapor that can be recovered from these systems have not been not indicated. In summary, all the above approaches have negative effects on the cooling efficiency of the cooling towers, their drawbacks are listed in the following table:

| Method | Visible plume | Drift | Blow down decrease | Water collection efficiency | Pressure drop | Investment cost |
|---|---|---|---|---|---|---|
| Plume abatement | ✓ | x | x | x | ✓✓ | Intermediate |
| Drift eliminator | x | ✓ | ✓ | ✓ | ✓✓ | Low |
| Fog net | x | ✓ | ✓ | ✓ | ✓✓ | Low |
| Fiber membrane filter | x | ✓ | ✓ | ✓ | ✓✓ | Low |
| Electrostatic separation | ✓ | ✓ | ✓✓ | ✓✓ | ✓ | Intermediate |

Windage or drift are water droplets that are carried out of the cooling tower with the exhaust air. Drift droplets have the same concentration of impurities as the water entering the tower. Plume is a stream of saturated exhaust air leaving the cooling tower. The plume is visible when water vapor it contains condenses in contact with cooler ambient air, like the saturated air in one's breath fogs on a cold day. Under certain conditions, a cooling tower plume may present fogging or icing hazards to its surroundings. Make-up is water that must be added to the circulating water system in order to compensate for water losses such as evaporation, drift loss, blow-out, blow-down, etc.

The exhaust gas from cooling towers forms visible plume which can impact the visibility and present fogging or icing hazards to its surroundings under some certain conditions and even result in traffic accidents. Moreover, the drift from cooling tower contains the same chemical constituents (such as minerals, debris and microorganisms and water treatment chemicals) as the circulating water, so it is usually responsible for damage to property near the cooling tower yard, such as buildings, cars, etc. Excessive drift losses pose serious health risks, not only because of the chemicals released, but also because of microorganisms that can be transmitted through drift.

Accordingly, there exists a need to provide a solution for preventing the large amount of water loss occurring from cooling towers.

SUMMARY OF THE INVENTION

Therefore it is an object of the present invention to provide a system and method for collecting water droplets from the airflow or exhaust gas of cooling towers, thereby preventing evaporative losses occurring from cooling towers.

The present invention involves a system for collecting water droplets from an airflow of a cooling tower through condensation of water vapor, the system comprising an electrostatic separator, wherein the electrostatic separator is a single unit electrostatic separator or a multi-unit electrostatic separator.

In an embodiment of the present invention, the electrostatic separator comprises a collector electrode and a discharge electrode.

In an embodiment of the present invention, the system for collecting water droplets from an airflow of a cooling tower further comprises a hot water tank, water heaters to control a temperature of water within the hot water tank, water pumps to pump cooled water back to the cooling tower, an acrylic tube for water vapor condensation, an annular water collection trough and a water collection tank.

In an embodiment of the present invention, an optimal selection of the collector electrode is based on diameter of the collector electrode and material used for the collector electrode.

In an embodiment of the present invention, an intensity of electric field generated by the collector electrode decreases with an increase in the diameter of the collector electrode.

In an embodiment of the present invention, the collector electrode is made of tubular metal or aluminium.

In an embodiment of the present invention, the discharge electrode is made of iron.

In an embodiment of the present invention, a number of sharp points on a cross-section of the discharge electrode is directly proportional to an intensity of electric field generated by the discharge electrode.

In an embodiment of the present invention, a current generated by a barbed plate geometry of the discharge electrode is higher than a current generated by any other discharge electrode geometry, at a same applied voltage.

In an embodiment of the present invention, a symmetric barbed plate discharge electrode (SBPDE) and an asymmetric barbed plate discharge electrode (ASBPDE) generate same electric fields.

In an embodiment of the present invention, single or multiple spray nozzles are used for producing water droplets for the single-unit and multi-unit electrostatic separator.

In an embodiment of the present invention, number of collector electrodes in a large and small sized multi-unit electrostatic separator are 7 and 19 respectively, wherein diameter of the multi-unit electrostatic separator is 290 mm, perforated acrylic plates are used to connect the collector electrodes together and an aluminium perforated plate is used as a ground connection.

In an embodiment of the present invention, performance of water droplet collection by the electrostatic separator is given by:

$$\zeta = |mcollected - mconsumed|/mconsumed, \text{ wherein}$$

ζ is performance of water droplet collection, mcollected is relative mass of collected water and mconsumed is relative mass of consumed water.

As another aspect of the present invention, a process for preventing evaporative losses occurring from a cooling tower by collecting water droplets from an airflow of the cooling tower is proposed, the process comprising the steps of controlling the airflow temperature using a water bath, setting a temperature for an ultrasonic mist generator using a heat exchanger, producing water droplets using the ultrasonic mist generator, passing the water droplets through an electrostatic separator, wherein the water droplets are charged and move towards a collector electrode due to an electric field force on passing through the electrostatic separator, forming large water droplets on a wall of the collector electrode and allowing the formed large water droplets to flow down to a collected water tank.

In an embodiment of the present invention, the ultrasonic mist generator is replaced by a nozzle.

In an embodiment of the present invention, a total collection efficiency for water droplets produced from the nozzle is higher than the water droplets produced from the ultrasonic mist generator.

In a preferable embodiment of the present invention, a method for water particles collection from an exhaust airflow of a cooling tower using a single unit or a multi-unit electrostatic separator is presented, wherein the method primarily comprises condensing water vapor into large water droplets.

In an embodiment of the present invention, the method further comprises the steps of heating tap water in a water tank using immersion heaters, pumping the heated tap water into the cooling tower, removing heat from the heated tap water through evaporation, producing water vapor and drift, passing the produced water vapor and drift through a fan located on top of the cooling tower, allowing the produced water vapor and drift to enter the electrostatic separator and charging the produced water vapor and drift, wherein the produced water vapor and drift move to a collector electrode and form large water droplets on a wall of the collector electrode and allowing the formed large water droplets to flow to a collector water tank.

In an embodiment of the present invention, efficiency of water collection from the exhaust airflow of the cooling tower depends on a state and size of the water vapor and drift.

In an embodiment of the present invention, efficiency of water collection is maximum when applied voltage is in a range of 17.5 kV to 20 kV, and corresponding power consumption is in a range of 6.1W to 13.5W.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which—

DETAILED DESCRIPTION OF THE INVENTION

The aspects of the method or system to provide a system and method for collecting water droplets from the airflow or exhaust gas of cooling towers, thereby preventing evaporative losses occurring from cooling towers according to the present invention, will be described in conjunction with FIGS. 1-28. In the Detailed Description, reference is made to the accompanying figures, which form a part hereof, and in which is shown by way of illustration specific embodiments in which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

It is possible to address the high water consumption of cooling towers by preventing water droplets from flowing out of cooling towers. With the increasing cost of water and decreasing fresh water resources, water consumption by industries has to be reduced and well managed. Existing technologies used to reduce the water consumption of cooling towers mainly focus on reducing the drift, plume and blowdown losses. However, evaporative losses are considered to be the prominent opponent, which accounts for about 1.2% to 1.6% loss of total circulating water of a cooling tower.

The proposed solution aims to collect water particles from the exhaust gas (water vapor) in a cooling tower based on a process which does not only save large amount of water but also protects the residents and property located around cooling towers from damage (traffic accidents, erosion and diseases) caused by cooling towers' emission. An experimental study is carried out to study the effects of polarity, geometry shape and materials of a discharge electrode, radius and length of a collector electrode, velocity and temperature of wet exhaust airflow from cooling tower, on the water collection efficiency. The performance of the water collecting system is evaluated by the economic feasibility and the ratio of collected water volume to consumed water.

As geometry of discharge and collector electrodes plays a very important role for optimizing the efficiency of particles collection, the performance of different electrodes was investigated in order to select appropriate electrodes subsequent to analysis of water particle collection efficiencies based on distributions of electric field and electron/ion concentrations. In accordance with the present invention, tubular metal is used as the collector electrode. The main parameters considered for selecting a size of the collector electrode include diameters of the electrodes and respective materials used.

Figure 1A:
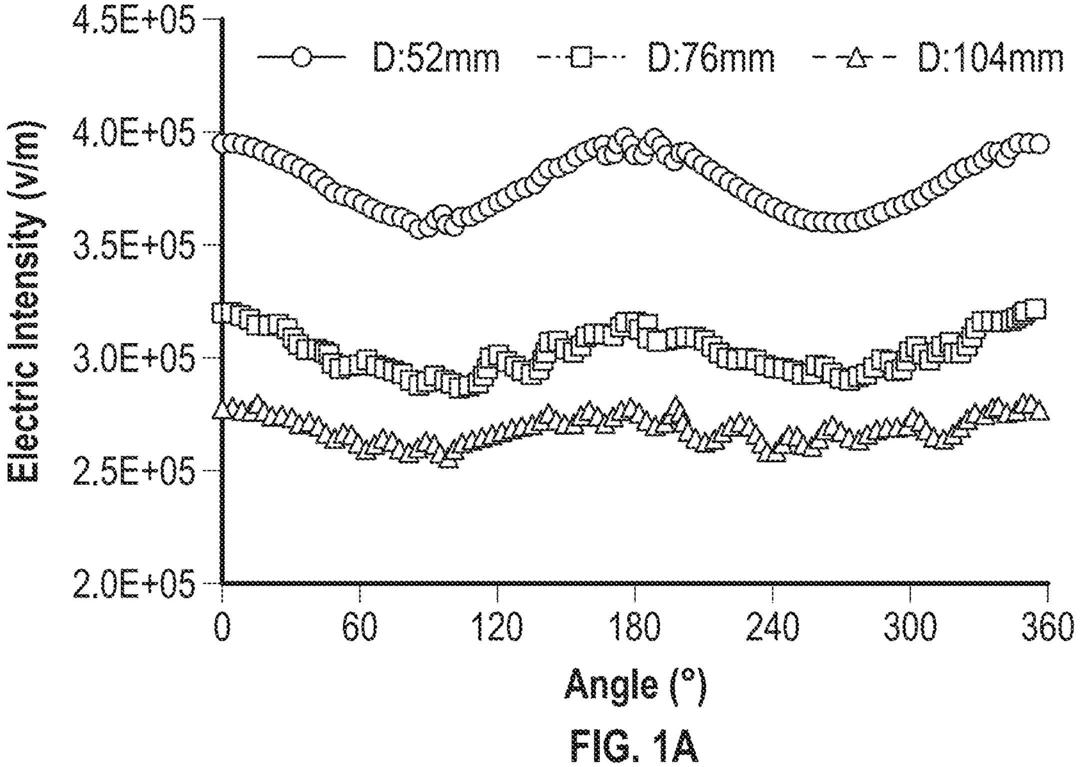
FIG. 1(*a*) shows the electric field intensity resulting from differently sized collector electrodes FIG. 1(*b*) displays a CVC curve denoting values of onset voltage and corresponding breakdown voltage with the increase of collector electrode diameter FIG. 1(*c*) shows CVC curves from different materials of collector electrode FIG. 2(*a*) shows a barbed plate discharge electrode FIG. 2(*b*) shows a pipe and spike discharge electrode FIG. 2(*c*) shows a sharp tip rod discharge electrode FIG. 2(*d*) shows a sharp tip rod with thin fins discharge electrode FIG. 3(*a*) displays generated intensity of electric fields generated by barbed plate discharge electrode FIG. 3(*b*) displays generated intensity of electric fields generated by pipe and spike discharge electrode FIG. 3(*c*) displays generated intensity of electric fields generated by sharp tip rod discharge electrode FIG. 3(*d*) displays generated intensity of electric fields generated by sharp tip rod with thin fins discharge electrode FIG. 3(*e*) displays electric field distribution along a measuring line from four different kinds of discharge electrodes FIG. 4(*a*) displays electric field distribution considering a number of sharp points on cross-section of discharge electrode FIG. 4(*b*) displays electric field distribution along a measuring line FIG. 5(*a*) displays electric field distribution from an asymmetric barbed discharge electrode FIG. 5(*b*) displays electric field distribution from a symmetric barbed discharge electrode FIG. 5(*c*) displays electric field distribution from a sharp tip rod discharge electrode FIG. 5(*d*) shows corona discharge of a symmetric barbed discharge electrode FIG. 6 displays electric field distribution along the measuring line from three different kinds of discharge electrodes FIG. 7(*a*) graphically displays CVC curves from different geometries of a discharge electrode FIG. 7(*b*) graphically displays CVC curves from symmetric and asymmetric discharge electrodes FIG. 8(*a*) shows the geometry of an electrostatic separator in accordance with the present invention FIG. 8(*b*) shows a picture of an electrostatic separator FIG. 8(*c*) shows displays corona glow
Figure 1B:
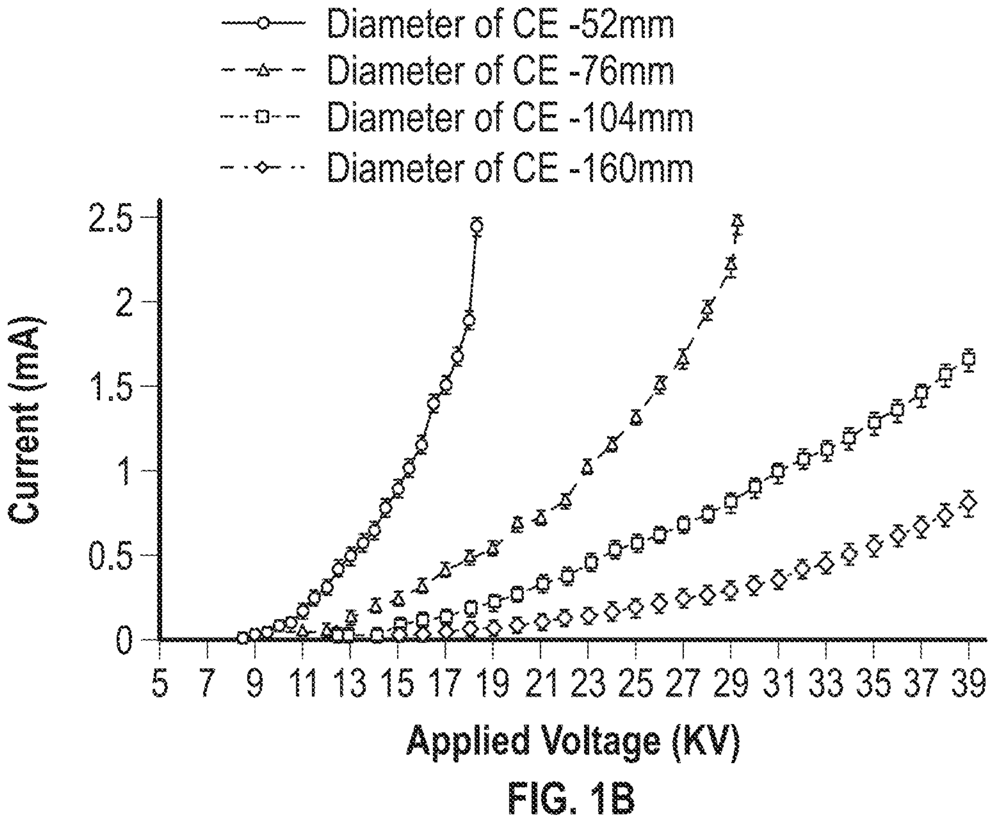
Figure 1C:
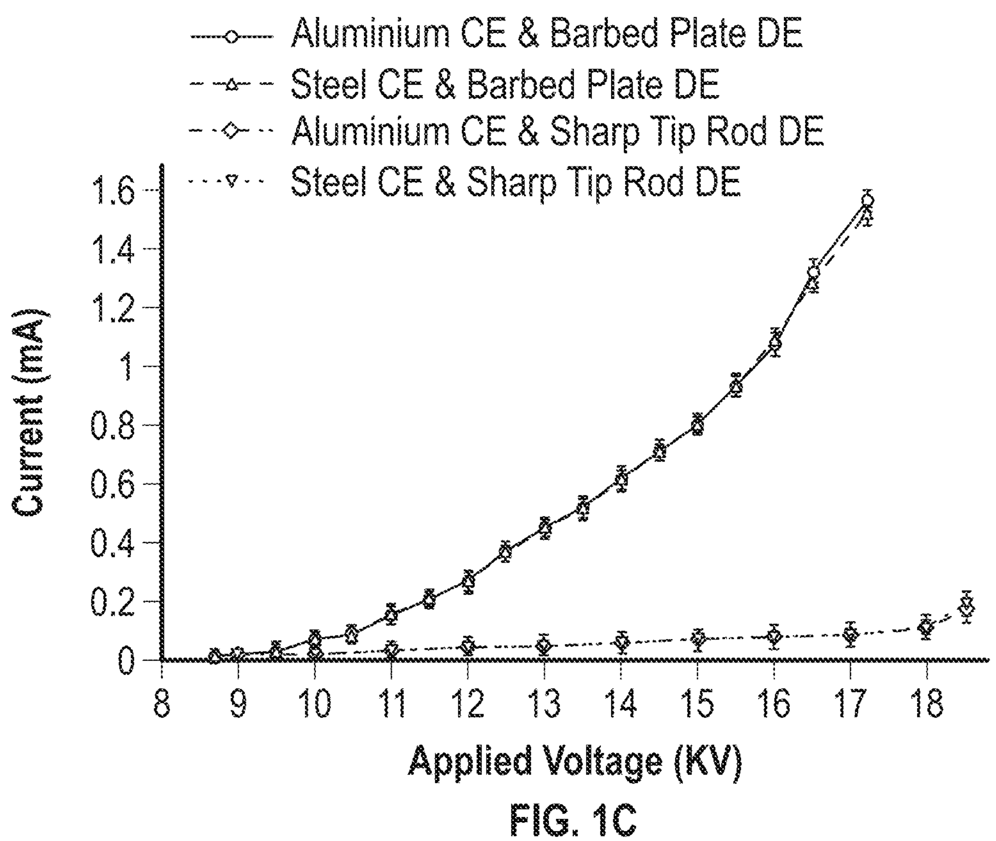

In accordance with an embodiment of the present invention, the material used for the discharge electrode is iron and the material used for the collector electrode is aluminium. Electrode voltages from the discharge electrode is 15 kV, and from the collector electrode (being a ground connection) is 0 V. FIG. 1(*a*) shows the electric field intensity resulting from differently sized collector electrodes. The simulation results show that with the increasing of the diameter of collector electrode, the electric intensity of the electric field decreased. The reason for the wave-shaped distribution line of electric field intensity is due to the varying distance between the collector electrode and discharge electrode, and also because increasing the diameter of the collector electrode results in a reduced distance changing rate. Accordingly, it is seen in FIG. 1(*a*) that amplitude of the wave-shaped line decreased for larger collector electrodes.

In accordance with another embodiment of the present invention, in order to further analyze whether the material of a collector electrode affects the electric field intensity resulting from the collector electrode, three different kinds of metal (copper, iron and aluminum) was used for the collector electrode. Each metal possessed a different value of bulk conductivity (copper: 58000000 S/m, iron: 10300000 S/m and aluminum: 38000000 S/m). The excitation voltage from discharge electrode was 15 kV, and the diameter of collector electrode was chosen as 52 mm. The results of this simulation showed that the electric field intensity along a circular line 20 mm away from the center of the discharge electrode had similar values, which shows that material of the collector electrode has little effect on the electric field strength, and hence proves that electric field threshold has little relation with conductivity of a metallic material.

As graphically shown in FIG. 1(*b*) displaying the CVC (a point of compound vertical curvature) curve, with the increase of collector electrode diameter, the values of onset voltage and corresponding breakdown voltage also increased. However, the ionization region of a bigger collector electrode is larger than that of a smaller sized collector electrode while the generated current is inversely proportional to the size of the collector electrode, which shows that the intensity of electric field is higher in smaller sized collector electrodes at a same applied voltage. Two different kinds of materials (steel and aluminum) are tested for the collector electrode with diameter (ϕ52 mm), to verify that the effect of materials on a generated electric field is very small Further, two different kinds of geometry for the discharge electrode (barbed plate and sharp tip rod) are used to eliminate differences caused by the discharge electrode. The experiment results as graphically represented in FIG. 1(*c*) show that the values of generated current at different applied voltage from different kinds of material of the discharge electrode are almost same.

Figures 2A, 2B, 2C, 2D:
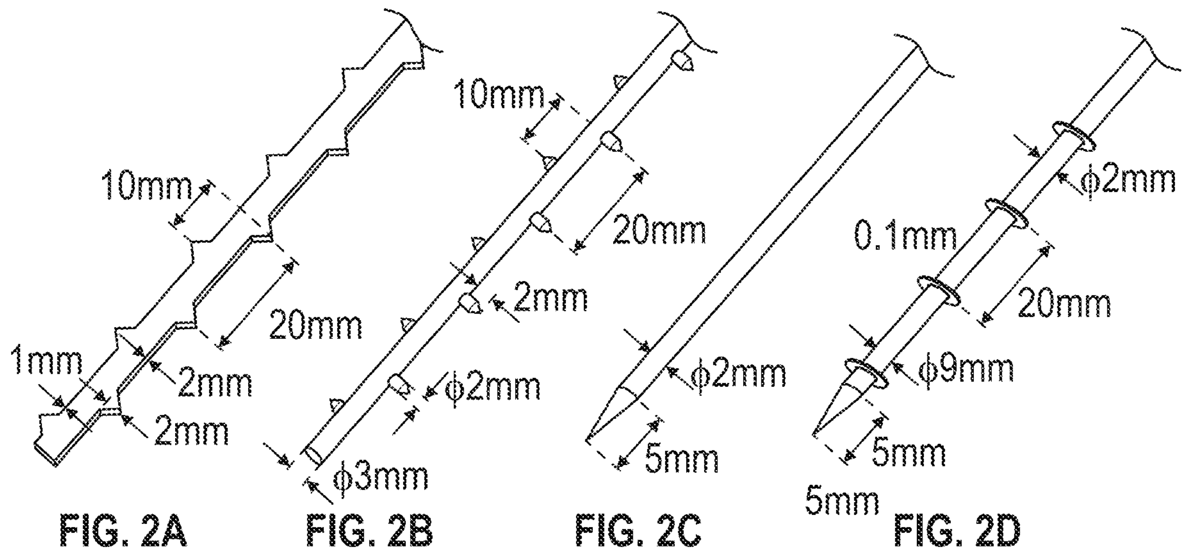
Figure 3B:
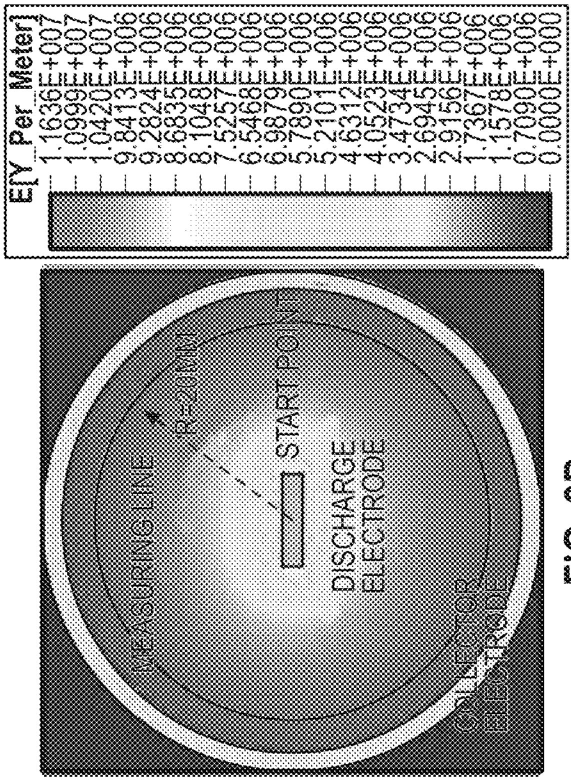
Figure 3D:
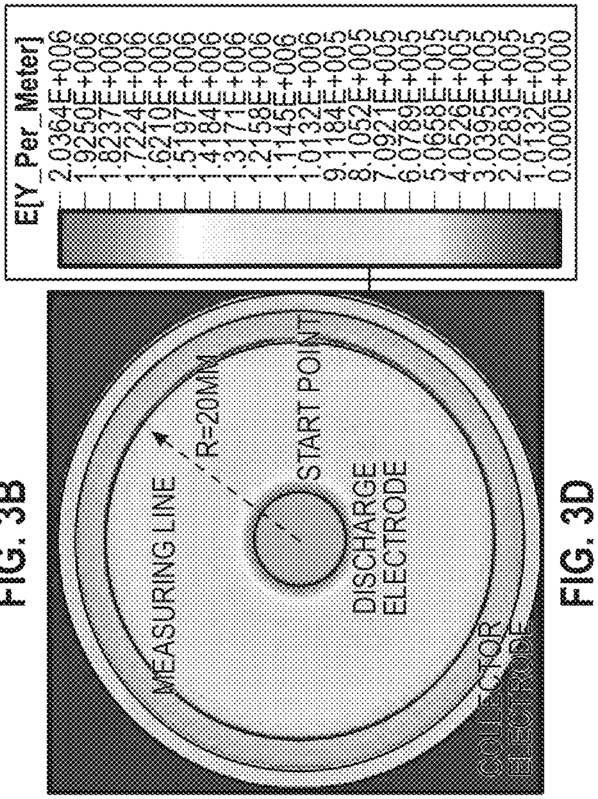
Figure 3A:
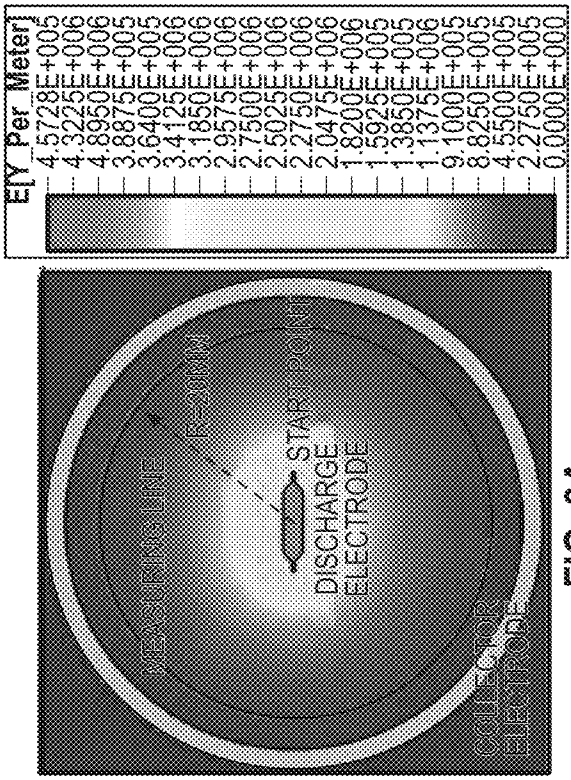
Figure 3C:
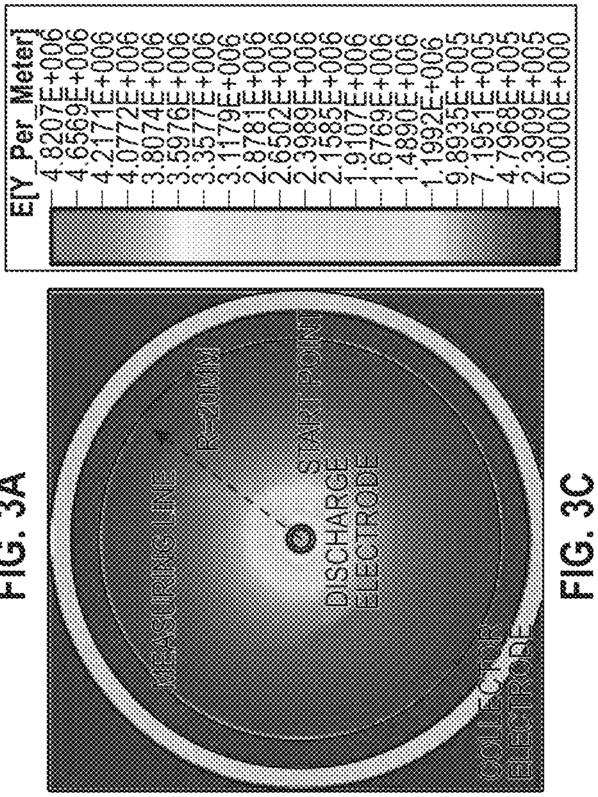
Figure 3E:
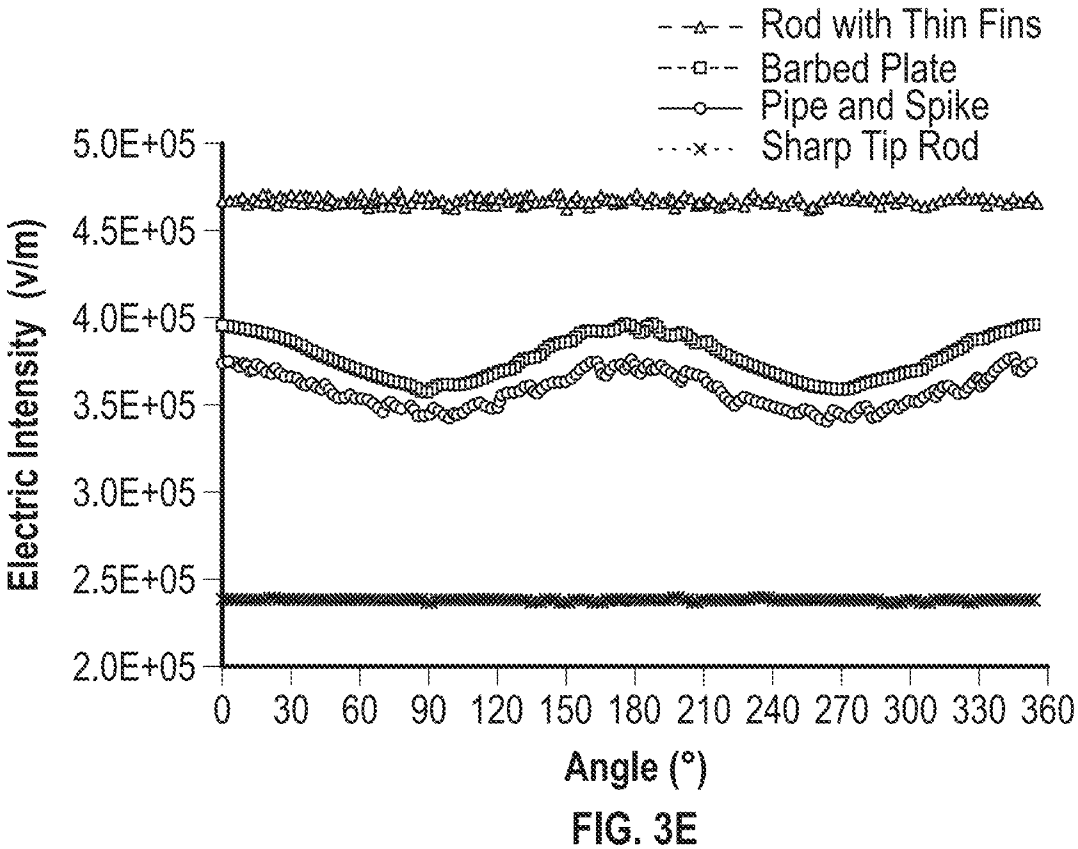

In another embodiment of the present invention, to select an optimal geometry of the discharge electrode, performances of four different geometries of discharge electrode, namely Barbed plate, Pipe and spike, Sharp tip rod and Sharp tip rod with thin fins is studied. These four geometries are illustrated in FIG. 2(*a*)-(*d*). Considering the simulation work conducted for optimal selection of the discharge electrode, the diameter of collector electrode was maintained as 52 mm, and the generated intensity of the electric fields generated by discharge electrodes of each geometry were analyzed from both the transverse section (top view) and vertical section (front view), as depicted in FIG. 3(*a*)-(*d*). FIG. 3(*e*) further graphically represents the electric field distribution along a measuring line from the four different geometries of discharge electrodes.

Figure 4A:
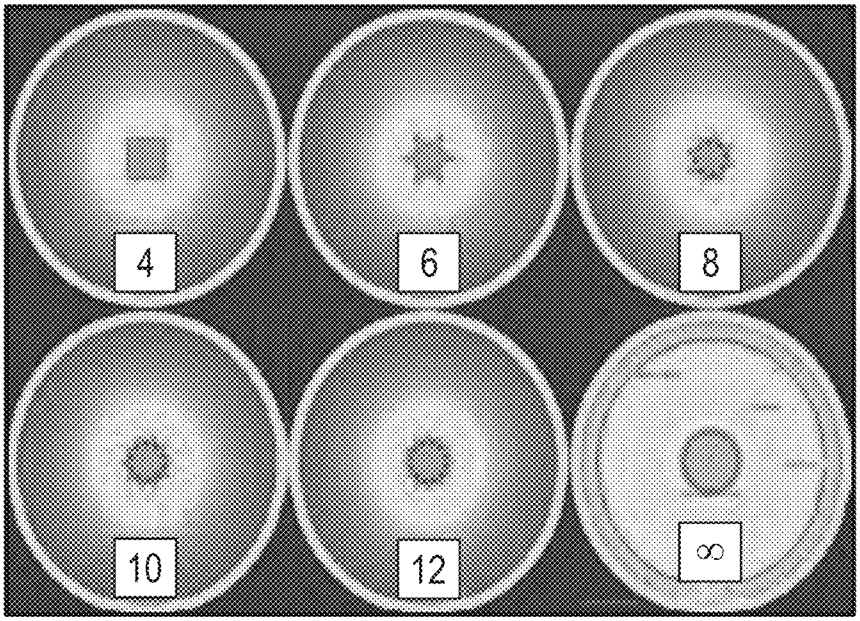
Figure 4B:
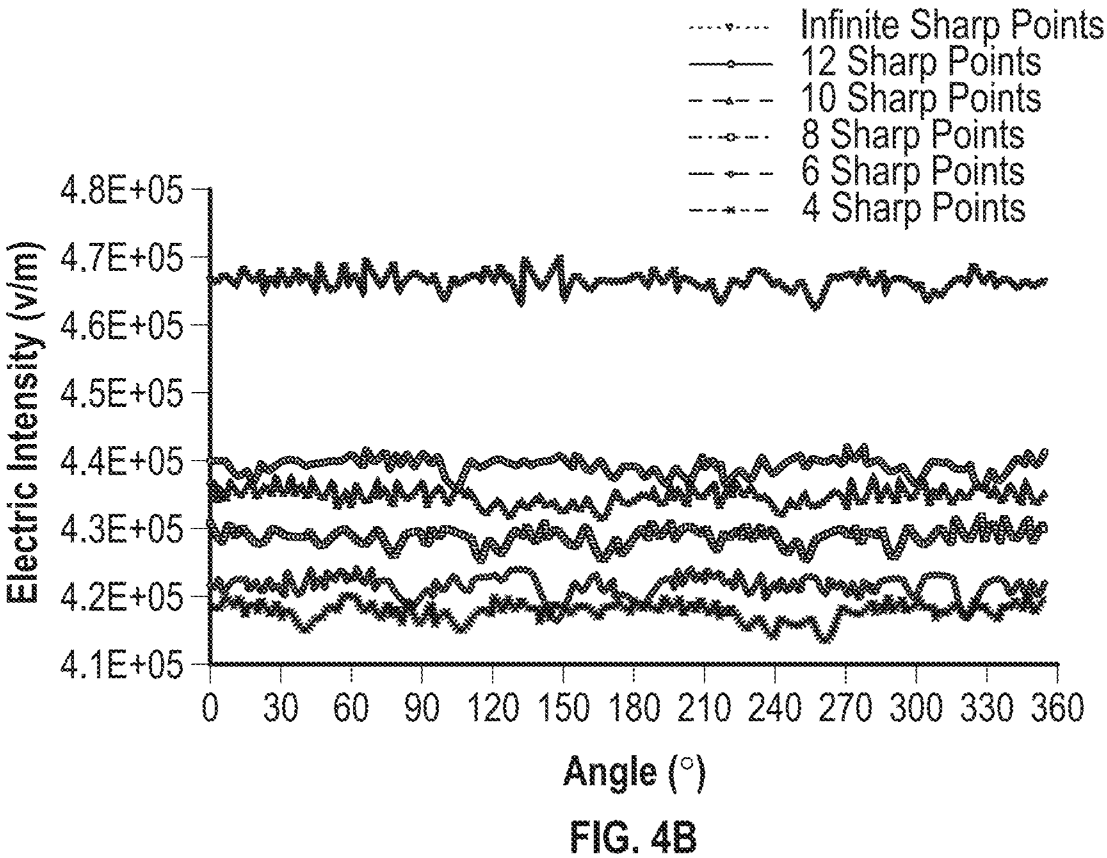
Figure 5A:
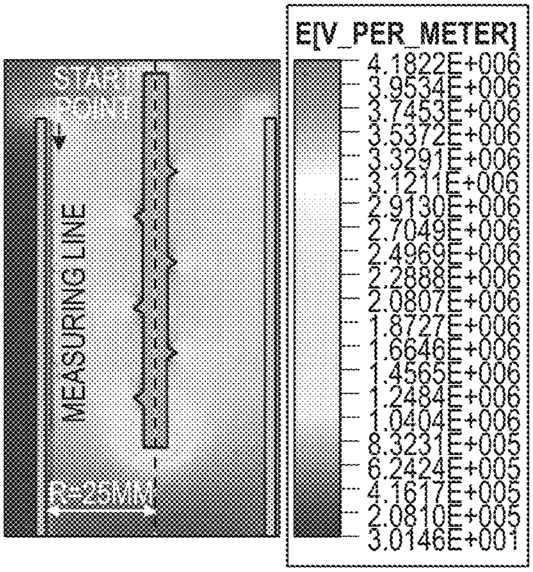
Figure 5B:
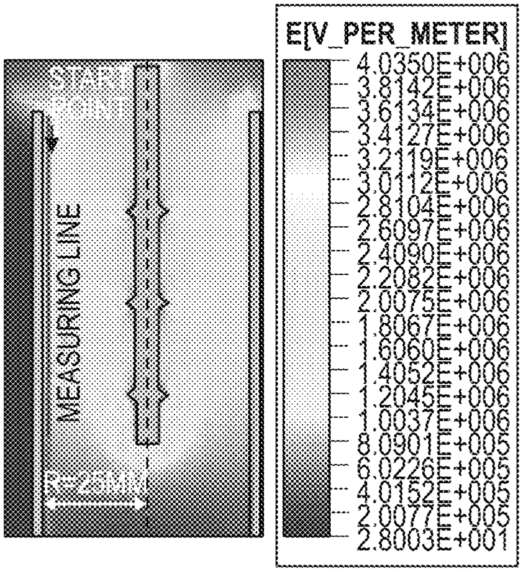
Figure 5C:
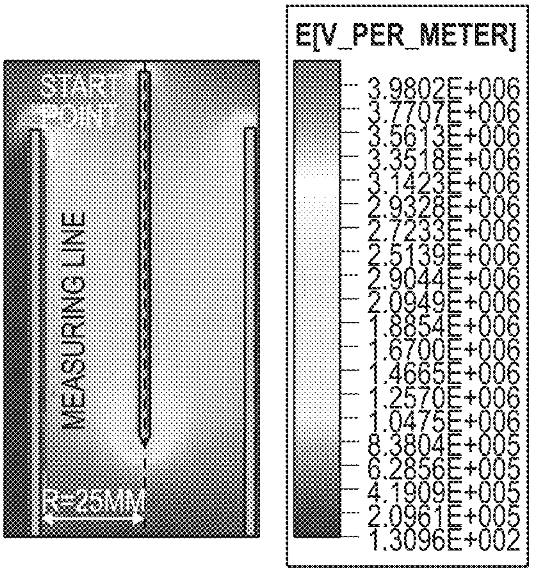
Figure 5D:
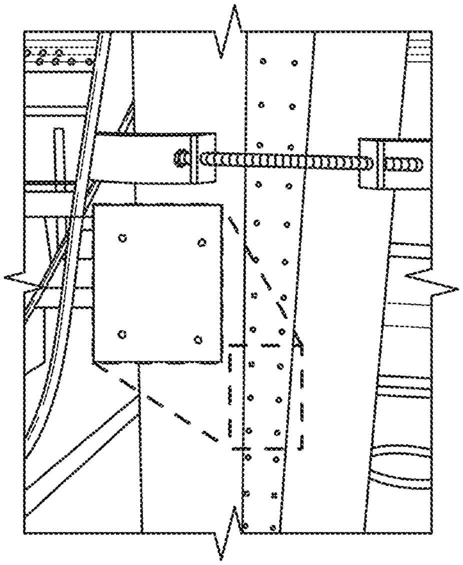
Figure 6:
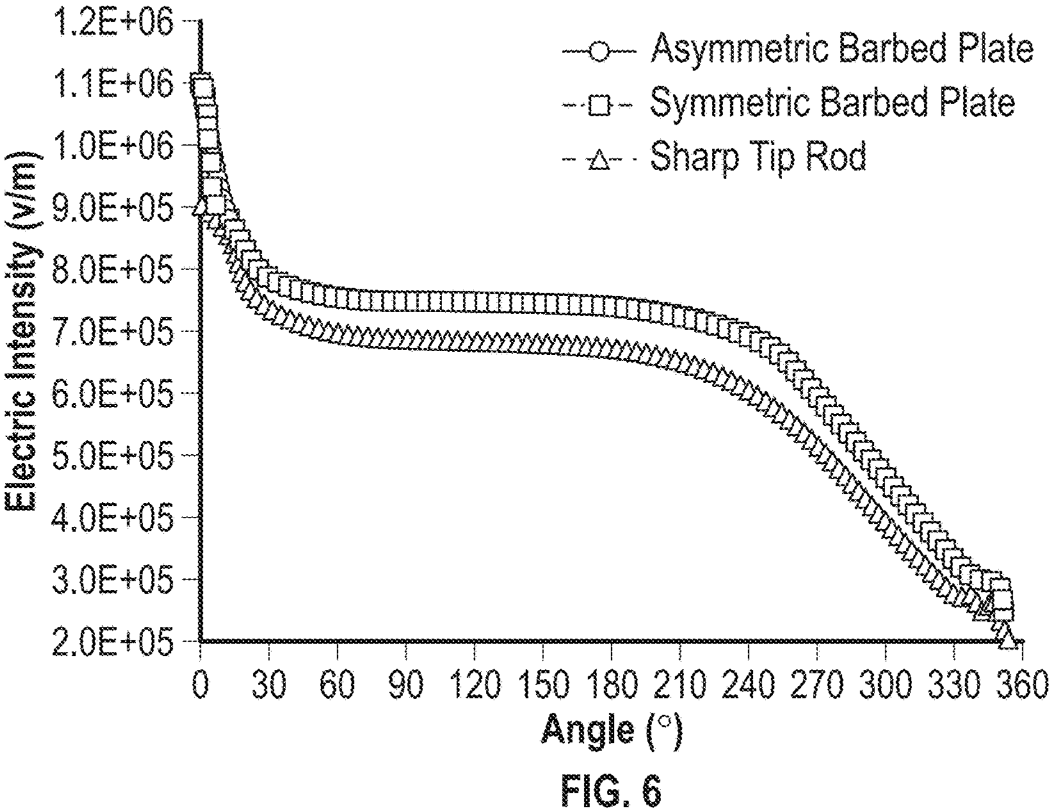
Figure 7A:
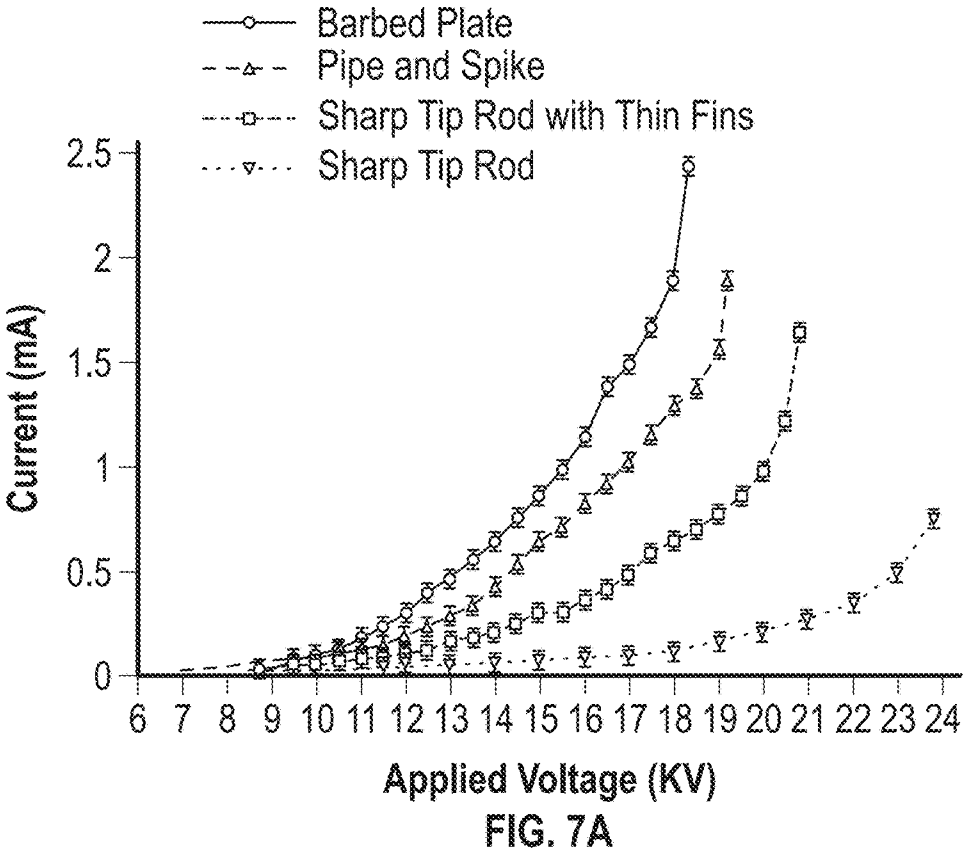
Figure 7B:
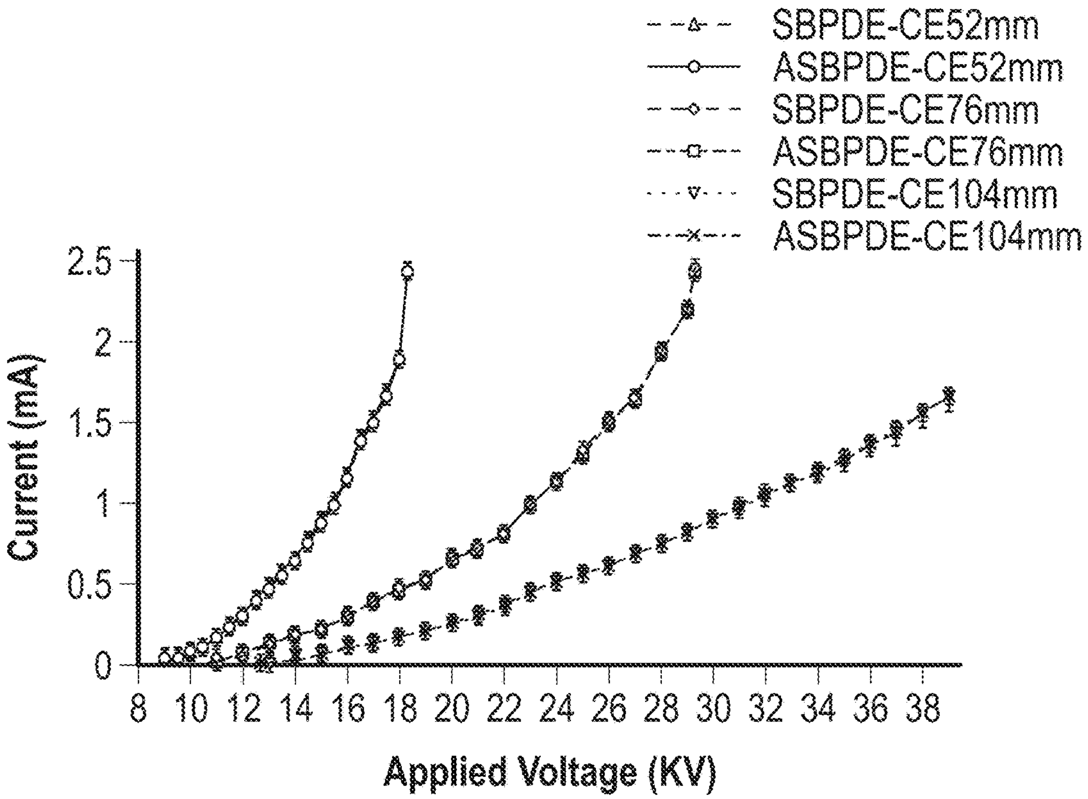

As shown in FIG. 4(*a*), the electric field intensity is largest near the discharge electrode and its value decreased along the direction of radius. The intensity along the measuring line near to the collector electrode was also compared to evaluate the total intensity of electric field from four different kinds of geometry of discharge electrode geometries. The results for this analysis are depicted in FIG. 4(*b*). FIG. 5 shows that the intensity of electric field from sharp tip rod with thin fins (STRF) geometry is the largest and most stable (due to consideration of zero thickness of the edge of the fin in the 2D simulation). In other words, since edges of the fins are very sharp, this makes it easy for the occurrence of corona discharge. However, the reality is the thickness of fins is about 0.1 mm, and so corona discharge only occurs in some sharp points along the edge.

In comparison, the intensity of electric field from barbed plate has a waved pattern like that of pipe and spike discharge electrode, and the former is higher than the latter. Since there are four sharp points for corona discharging from barbed plate discharge electrode while there are only two from pipe and spike discharge electrode, it is proved that the number of sharp points present on the discharge electrode has a significant effect on intensity of electric field (shown in FIG. 6). The reason as to why the intensity of electric field from the sharp tip rod is the smallest owes to the fact that the diameter of its cross section is smallest (2 mm). The results from the above analyses show that the number of sharp points on a cross-section of the discharge electrode is proportional to the generated intensity of electric field. However, infinity of sharp points on the cross-section of discharge electrode does not exist.

In another embodiment of the present invention, the electric distribution difference between symmetric and asymmetric geometry of barbed plate was investigated to verify whether the layout of barb could affect the distribution of electric field or not. The reason no simulation of pipe and spike discharge electrode and STRF discharge electrode was separately conducted is because the geometries of these electrodes on the vertical section are similar to that of the barbed plate discharge electrode. As shown in the CVC curve plotted for different geometries of the discharge electrode (FIG. 7(*a*)), corona discharge only occurred on the sharp tips of discharge electrode, and the strongest electric field was observed near the sharp tip. Electric field intensity decreased along the radial direction.

Considering that is difficult to judge the electric field from which discharge electrode is the best, the electric field intensity near to the collector electrode was measured since it has the smallest value of intensity of electric field. The measured results are displayed in FIG. 7(*b*), which illustrates that the electric field intensity distribution from asymmetric and symmetric barbed plate discharge electrodes have almost the same values. This means that the layout of barb on discharge electrode does not affect the total intensity of electric field except the areas near to the sharpened tips. Another observation is that the barbed plate discharge electrode generates a stronger electric field than the one sharp tip rod discharge electrode.

In an embodiment of the present invention, experimental work is conducted to test current-voltage characteristics of four different geometries of discharge electrodes and the experiment results are compared with the simulation conducted. Subsequent to the comparison, the discharge electrode which has the best performance among the four geometries of discharge electrodes was selected. The results show that the barbed plate discharge electrode has a relatively wide operation range, and the generated current is higher than that of other discharge electrodes at the same applied voltage, proving that this discharge electrode has the best economy for application. In comparison, the performance of pipe and spike and STTF discharge electrodes rank second and third. Although sharp tip rod discharge electrode is the lightest one, the performance of its CVC is the worst. The simulation results show that symmetric barbed plate discharge electrode (SBPDE) and asymmetric barbed plate discharge electrode (ASBPDE) produce almost the same electric fields.

Symmetric and asymmetric discharge electrodes are tested with three different diameters of the collector electrode. The CVC curves of symmetric and asymmetric discharge electrodes almost overlap which indicate that symmetric and asymmetric discharge electrodes display similar performances of corona discharge. As both discharge electrode and collector electrode play a dominant role in the structure of an Electrohydrodynamic (EHD) device, their performances directly affect water particle collection efficiency. Accordingly, the results from both simulations and experiments show that barbed plate discharge electrode displays the best CVC and generates the strongest electric fields among four different kinds of discharge electrodes. Besides, the EHD device has a relatively wide range of applied voltage and stronger electric field when the diameter of the collector electrode is 76 mm.

Figure 8A:
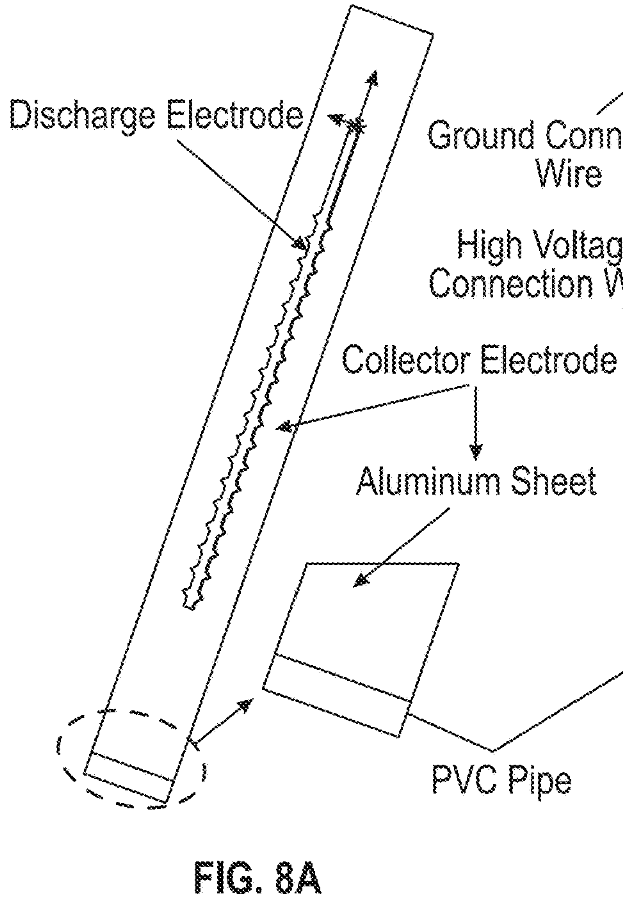
Figure 8B:
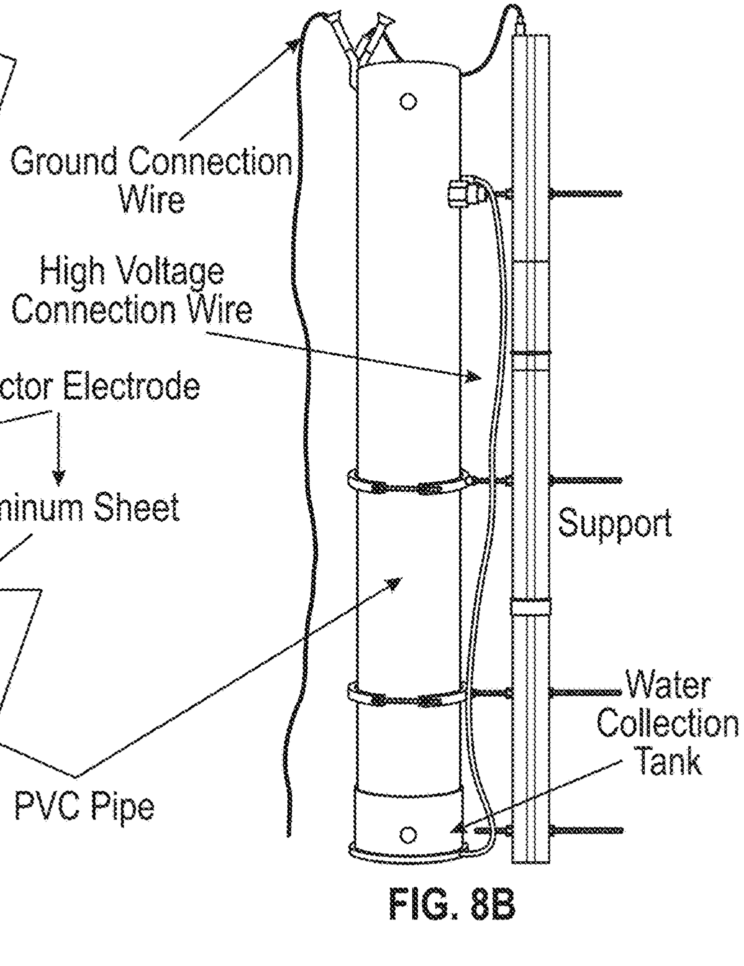
Figure 8C:
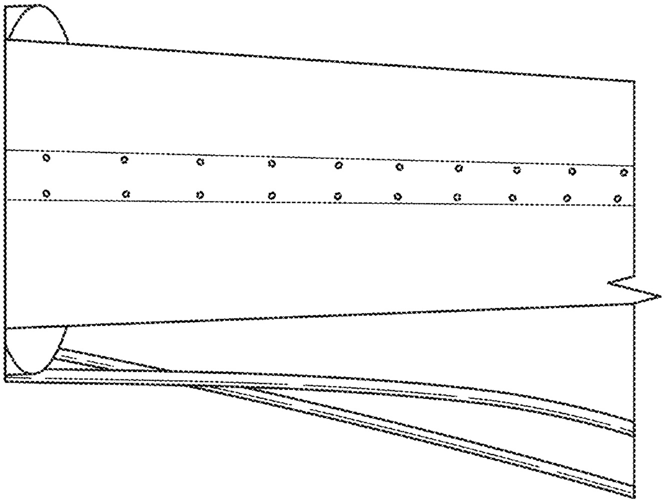

In another embodiment of the present invention, a study of the effect of parameters such as applied voltage, airflow velocity and airflow temperature on the separation of water droplets from a nozzle (1 mm) and ultrasonic mist generators in airflow was performed using barbed plate discharge electrode and tubular collector electrode. The key component of the experiment is the electrostatic separator, which includes a barbed plated discharge electrode and a PVC pipe covered aluminum sheet (0.1 mm) tubular collector electrode. The length of the discharge electrode and collector electrode are 450 mm and 700 mm, respectively. The diameter of collector electrode is 76 mm. One of the reasons to use PVC pipe to cover aluminum sheet (0.1 mm) is its significantly lower thermal conductivity (0.19 $Wm^{-1}k^{-1}$) compared to aluminum which can effectively prevent airflow leading to minor heat exchange with ambient environment. The other advantage of using PVC is smaller overall weight of electrostatic separator. The geometries of electrostatic separator and corona glow at the discharge electrode surface when voltage is applied are shown in FIG. 8.

Figure 9:
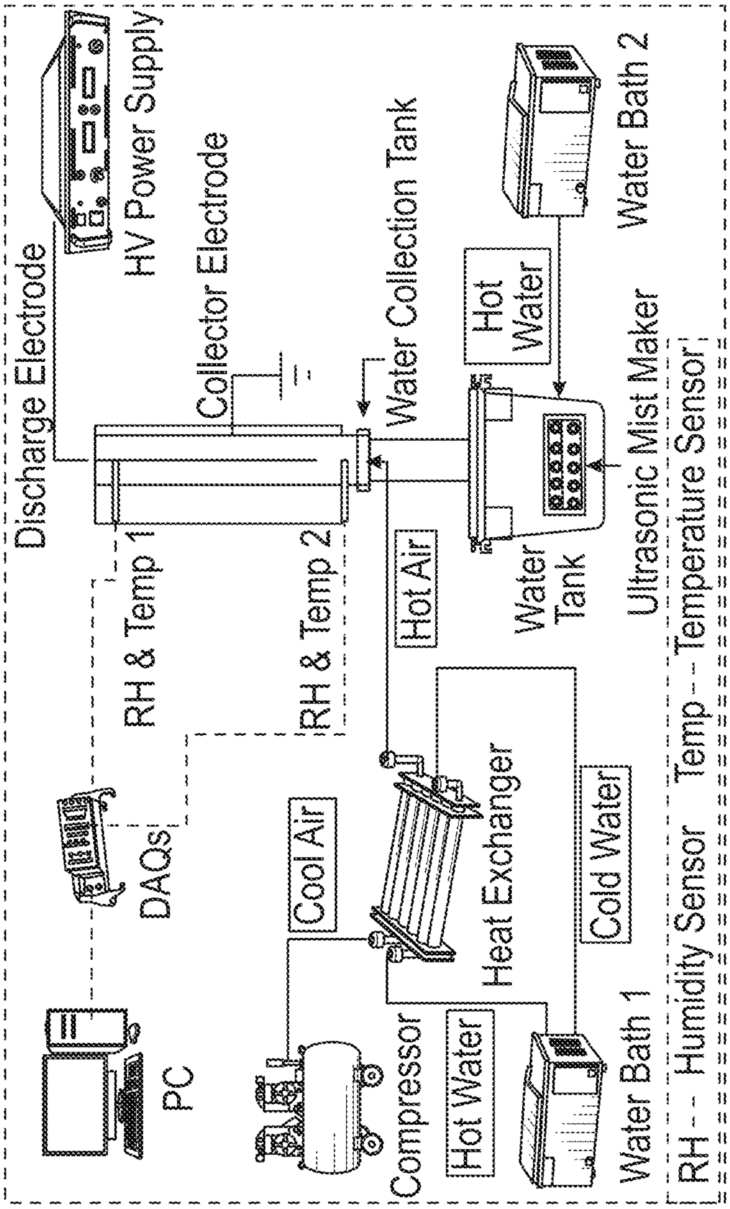
FIG. 9 is a schematic sketch of an experimental setup for the Ultrasonic Mist Maker in accordance with the present invention FIG. 10 graphically denotes water droplets size distribution from the Ultrasonic mist generator FIG. 11(*a*) graphically denotes the effect of airflow velocity on collection efficiency FIG. 11(*b*) graphically denotes the changing of airflow temperature in the electrostatic separator FIG. 12(*a*) shows theoretical charge distribution on the surface of a charged droplet FIG. 12(*b*) shows the actual charge distribution under external electric field

Further, an open loop experimental setup, as shown in FIG. 9, is used to test the performance of electrostatic separator for different sized water droplets in airflow. In the experiment, airflow temperature is controlled by a water bath and heat exchanger to the set temperature for both nozzle and ultrasonic mist generator. For ultrasonic mist generator, gas source is provided by compressor, and water droplets produced by ultrasonic mist generator will be entrained into electrostatic separator. Water droplets will be charged and move to collector electrode under the function of electric field force when it passes through the electrostatic separator. This forms big water droplets on the wall of collector electrode and flows down to a collected water tank under the force of gravity. For the nozzle, a similar experimental setup is used, the only difference being that the water droplets source are replaced by a nozzle in place of the ultrasonic mist generator. Details of the instruments and devices used for the experiment are described in the following tables:

| Equipment | Recommended Model | Specifications |
|---|---|---|
| High voltage power supply | Reversible polarity Glassman High Voltage, Inc. (PS/FX40R07.5-22) | Output Voltage: −40-+40 KV dc<br>Output Current: 0-7.5 mA<br>Input Voltage: 198-264 V ac, 40-400 HZ<br>Accuracy is 0.5% of rated +0.2% of setting |
| Aerodynamic Particle Sizer (APS) | TSI-3321 | Particle concentration: 0.001-10,000 particles/cm$^3$<br>Maximum processing rate: >200,000 particles/sec |
| Water bath | Cole-Parmer Polystat (EW-12122-04) | Voltage: 230 V 50 HZ<br>Max. flow: 17 L/min<br>Temperature: −20~+100° C.<br>Temp Control: PID |
| Ultrasonic Mist Maker (2) | Warmtoo | Working voltage: DC 24 V<br>Power: 38 W<br>Atomization: >800 cc/har<br>Working Temperature: <60° C. |
| Nozzle | ATOM ¼-J-SS | Pressure: <3 bar |

| Sensor | Recommended Model | Specifications |
|---|---|---|
| Flowmeter | OMEGA FTB-1425 | Accuracy: ±1% of reading<br>Repeatability: ±0.1%<br>Flow Range: 18.9 to 189 LPM<br>Pressure Rating: 5000 psi (maximum)<br>Temperature Range: −101 to 177° C.<br>End Connections: NPT, BSPP optional |
| Thermocouple | Type k | Accuracy: ±2.2° C.<br>Temperature Limits: −270 to 1260° C.<br>Type: k |
| Humidity sensor | Vaisala (HMT310) | Range: 0-100% R.H.<br>Error: ±0.6% R.H@ 0 . . . 40% RH ± 1.0% R.H@ 40-97% RH<br>Temperature: ±0.1° C. |
| Anemometer | Testo 425 | Range: 0~20 m/s, −20~+70° C.,<br>Accuracy: ±0.03 m/s , ±0.5° C.<br>Resolution: 0.01 m/s<br>Operating Temperature: −20 to 50° C.<br>Humidity: Non condensing |
| DAQs | NI 9203<br>NI 9211<br>NI 9482 | Relative Humidity & Temperature<br>Thermal Couples<br>Relay Controlling |

Figure 10:
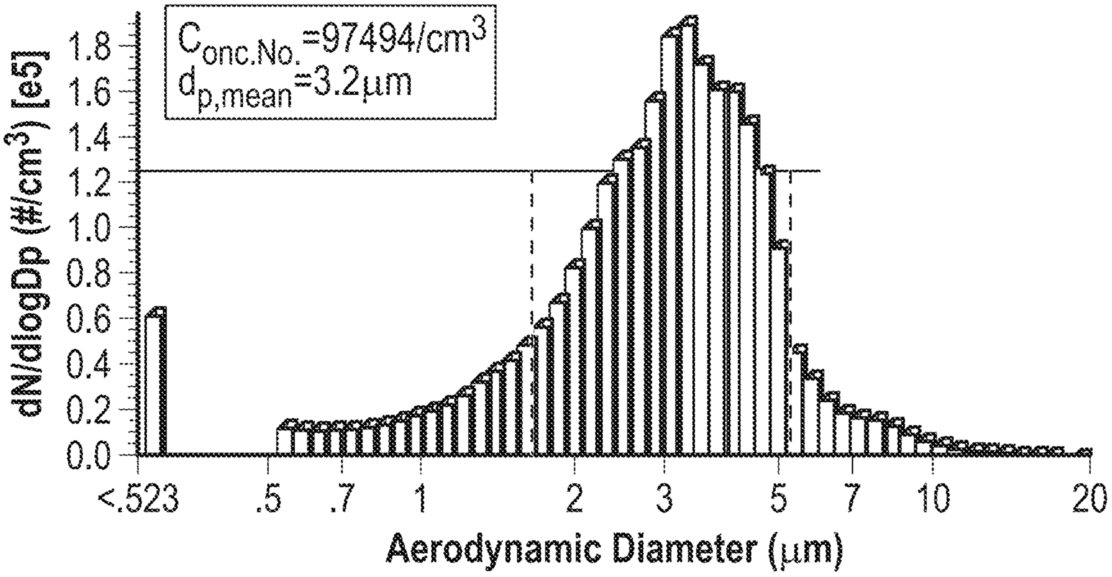

The effect of varied parameters, including applied voltage, airflow velocity and temperature on the performance of electrostatic separation was investigated. The parameter ranges are shown in the following table. The size distribution of water droplets that produced by ultrasonic mist generator is shown in FIG. 10. The results are presented based on the collection efficiency of water droplets for different values of applied voltage.

| | |
|---|---|
| Applied Voltage (KV) (Negative Polarity) | ϕe = 0, 9.8, 11.5, 13, 15, 17.5, 20, 25, 28.4 |
| Airflow Temperature (° C.) | Tairflow = 25, 32, 37 |
| Airflow Velocity (m/s) | Vairflow = 0.5, 1.2, 1.8 |
| Water droplets size (μm) | dP = 1.7~5.4, dP_mean = 3.2 |

Figure 11A:
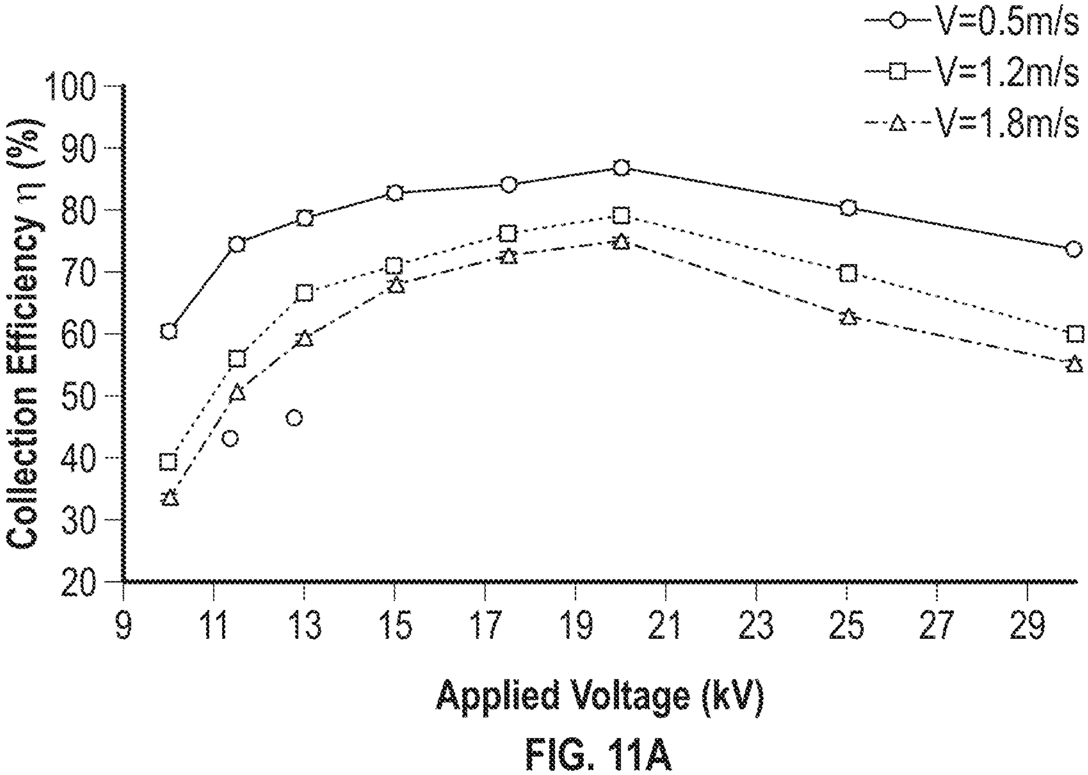
Figure 11B:
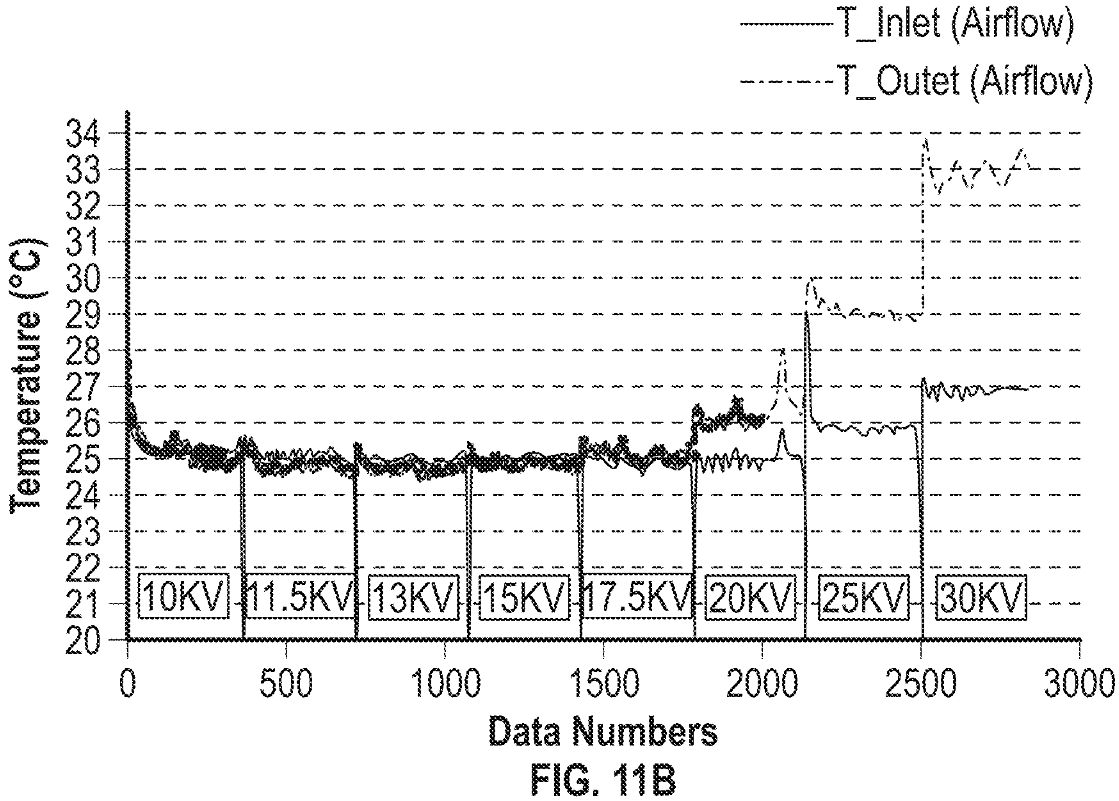

For the airflow, when temperature is 37° C. and velocity is 0.5 m/s, the applied voltage starts from 9.8 kV and end at 28.4 kV, which represents the onset voltage and (a little less than) breakdown voltage, respectively. However, when the applied voltage is zero the electrostatic separator does not work and hence is considered as a control experiment. It was hence observed that the mean size of water droplets from a nozzle is less than that from ultrasonic mist generator. The effect of the airflow velocity on the water droplets separation efficiency was studied and it was observed that changing the airflow velocity in the set range almost does not have effect on the CVC curve. Therefore the charging process would be the same for all cases. The results of water droplets collection efficiency of different velocity airflow are shown in FIG. 11(*a*). It can be further seen from FIG. 11(*a*) that the water droplet collection efficiency increased firstly and then decreased when applied voltage increased from onset voltage to breakdown voltage. However, the total collection efficiency for water droplets from the nozzle is a little higher than that of ultrasonic mist generator. For instance, the maximum collection efficiency of different airflow velocity is from 74.89% to 86.67% for water droplets from the nozzle, while the corresponding data for water droplets from ultrasonic mist generator is from 56.51% to 83.33%.

Similarly, in accordance with the present invention, the decreasing trend can be explained by the temperature increase of outlet airflow of electrostatic separator. As shown in FIG. 11(*b*), when the applied voltage surpasses 15 kV, airflow temperature of the inlet starts to exceed the temperature of outlet airflow from the electrostatic separator. The temperature of outlet airflow of the electrostatic separator rose dramatically when applied voltage increased to 25 kV, and more electricity was consumed by the heat released from discharge electrode, which also resulted in more evaporation loss of water droplets.

Figure 12A:
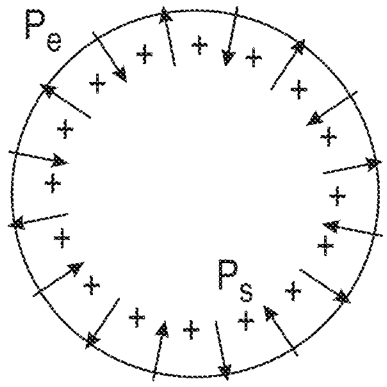
Figure 12B:
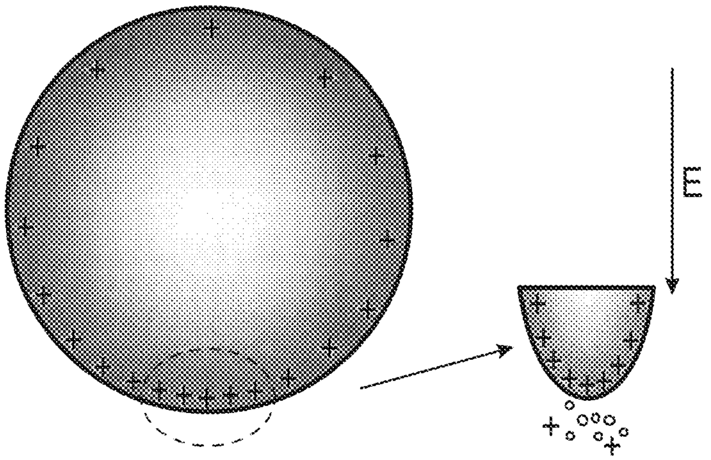

In an embodiment of the present invention, the decrease of collection efficiency of water droplets at higher applied voltages is explained by the theory of break-up of charged droplets. Once the bigger sized charged droplets breakup into smaller sized droplets, this is difficult to be collected by an electrostatic separator and the collection efficiency will decrease. In an electric field, when electric charges accumulate on the surface of a droplet, the charged droplet breaks up into smaller sub-droplets since mutual repulsion of electric charges exceeds the confining force of surface tension, the limiting charge, called the Rayleigh limit. This is given by equation (1):

$$n_l = \left(2\pi\gamma d_P/KE^{e^2}\right)^{1/2} \quad (1)$$

wherein γ is surface tension of the droplet. The number of accumulated charges was checked against the Rayleigh limit. It is obvious that accumulated charges over all the water droplet is less than the Rayleigh limit charge. However, the Rayleigh limit charge theory is based on the fact that charges on the surface of a charged droplet distribute evenly, as shown in FIG. 12(*a*) which is against the reality that the distribution of charges on the surface of charged droplets are uneven in an electric field, as shown in FIG. 12(*b*). Charges tend to move to parts of the droplet surface under the function of electric force. If the electric field is strong, charge density on the surface of charged particles will reach the Rayleigh limit charge and then breakup. Therefore, it is possible that the breakup of charged droplet causes low collection efficiency of water droplets at high applied voltage.

Figure 13:
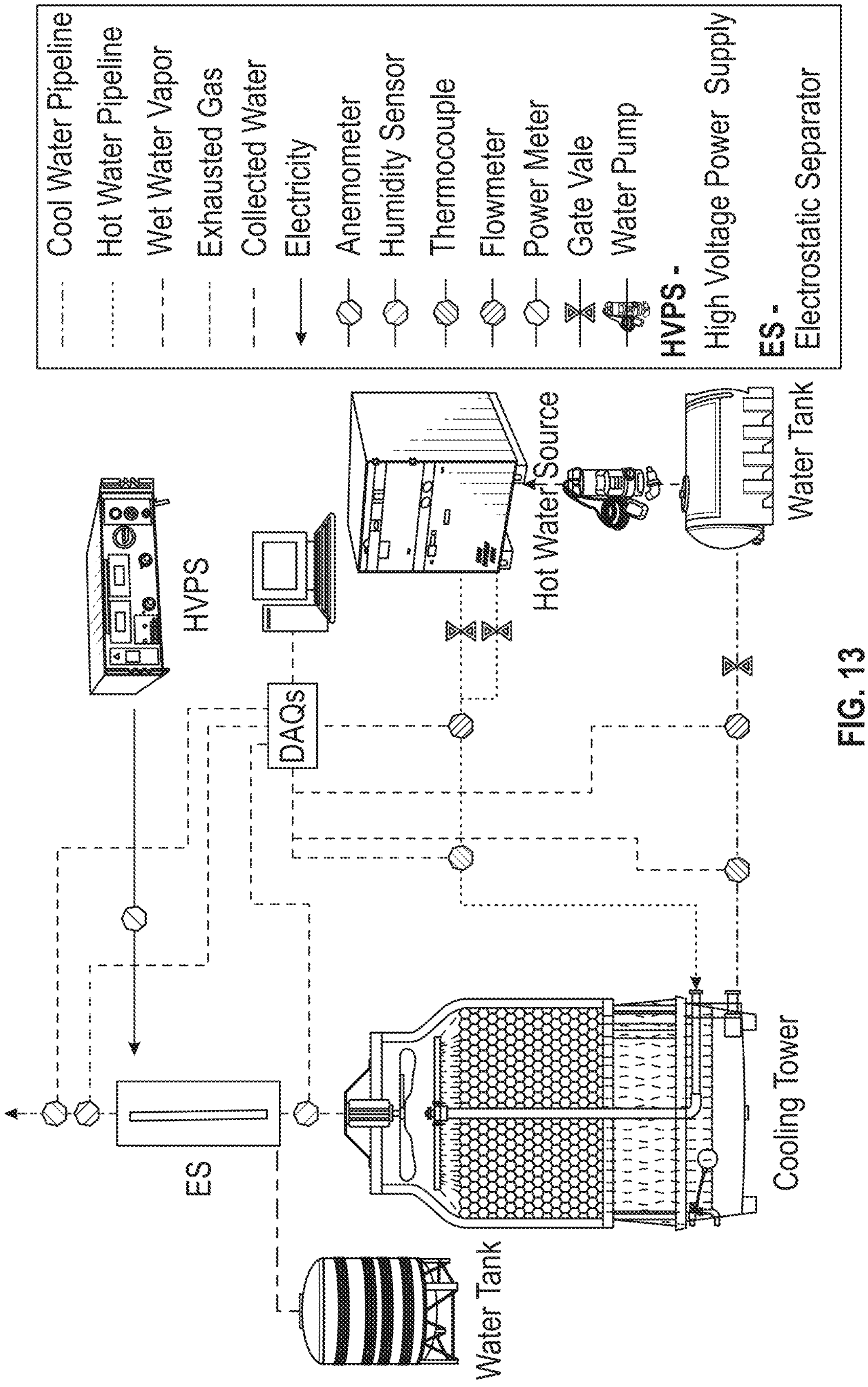
FIG. 13 is a schematic sketch of an experimental setup for a cooling tower in accordance with the present invention FIG. 14 graphically denotes the changing of inlet and outlet airflow temperature with different applied voltages

In accordance with a preferable embodiment of the present invention, water particles collection from the exhaust airflow of cooling towers is performed by using a single unit electrostatic separator and a multi-unit electrostatic separator. This primarily involves the method of making water vapor condense into bigger water droplets. A test rig is constructed and the performance of the single unit electrostatic separator and multi-unit electrostatic separator design is evaluated based on water collection efficiency. An open loop experimental setup, as shown in FIG. 13, is used to test the performance of an electrostatic separator for collection of water droplets from the exhaust airflow of a cooling tower.

In this experiment, tap water is heated in a water tank by immersion heaters to a desired temperature which is pumped into the cooling tower. After evaporation, heat is removed from the hot water and this process produces a large amount of water vapor and drift. Cooled water may be recycled after treatment. Water vapor and drift pass through a fan on top of the cooling tower and then enter into the electrostatic separator. Water particles are charged and move to the collector electrode under the function of electric field force, thereby forming big water droplets on the wall of the collector electrode and flowing down to a collector water tank under the force of gravity. The specifications of main equipment and sensors used for the experiment are listed in the following tables.

| Equipment | Recommended Model | Specifications |
|---|---|---|
| High voltage power supply | Reversible polarity Glassman High Voltage, Inc. (PS/FX40R07.5-22) | Output Voltage: −40-+40 KV dc<br>Output Current: 0-7.5 mA<br>Input Voltage: 198-264 V ac, 40-400 HZ<br>Accuracy is 0.5% of rated +0.2% of setting |
| Cooling tower | Hua Liang (8T) | Flow: 6.23 $m_3$/h<br>Dimension: ϕ 930 × 1460 mm<br>Net weight: 42 Kg<br>Operating weight: 180 Kg<br>Inlet pipe diameter: 40 mm |
| Aerodynamic Particle Sizer(APS) | TSI-3321 | Particle concentration: 0.001-10,000 particles/$cm^3$<br>Maximum processing rate: >200,000 particles/sec |
| Water bath | Cole-Parmer Polystat (EW-12122-04) | Voltage: 230 V 50 HZ<br>Max. flow: 17 L/min<br>Temperature: −20~+100° C.<br>Temp Control: PID |
| VFD | Delta-M00721A | Power: 0.75 KW<br>Input voltage: 230 VAC single phase<br>Outout voltage: 0~240 VAC three phase<br>Frequency range: 0~60 Hz |
| Nozzle | ATOM ¼-J-SS | Pressure: <3 bar |

| Sensor | Recommended Model | Specifications |
|---|---|---|
| Flowmeter | OMEGA FTB-1425 | Accuracy: ±1% of reading<br>Repeatability: ±0.1% |

-continued

| Sensor | Recommended Model | Specifications |
|---|---|---|
| | | Flow Range: 18.9 to 189 LPM<br>Pressure Rating: 5000 psi (maximum)<br>Temperature Range: −101 to 177° C.<br>End Connections: NPT, BSPP optional |
| Thermocouple | Type T | Accuracy: ±1.0° C.<br>Temperature Limits: −250 to 260° C.<br>Type: T |
| Humidity sensor | Vaisala (HMT310) | Range: 0-100% R.H.<br>Error: ±0.6% R.H@ 0 . . . 40% RH ± 1.0% R.H@ 40-97% RH<br>Temperature: ±0.1° C. |
| Anemometer | Testo 425 | Range: 0~20 m/s, −20~+70° C.,<br>Accuracy: ±0.03 m/s , ±0.5° C.<br>Resolution: 0.01 m/s<br>Operating Temperature: −20 to 50° C.<br>Humidity: Non condensing |
| DAQs | NI 9203<br>NI 9211<br>NI 9482 | Relative Humidity & Temperature<br>Thermal Couples<br>Relay Controlling |

As observed from the conducted experiment, the higher the airflow speed, the more water is collected, and this is independent of the operating state of the electrostatic separator. The amount of collected water from electrostatic separator increased when applied voltage was increased from 10 kV to 15 kV, whereas, it decreased to less than the water collected from natural condensation when the applied voltage surpasses 20 kV. When applied voltage reached 25 kV, the amount of collected water from electrostatic separator decreased dramatically to about half of that obtained from natural condensation in all speed condition. The main reason for low efficiency of water collection from the exhaust airflow of cooling towers mainly resulted from the state and size of water vapor. Water vapor is the gas state of water, and its size is the same as the size of a water molecule (0.4 nm), which is much less than the sub-micrometer particle that is collected by electrostatic separator with low collection efficiency. Although some water vapor condensed to bigger size water droplets, the concentration was seen to be very low.

Figure 14:
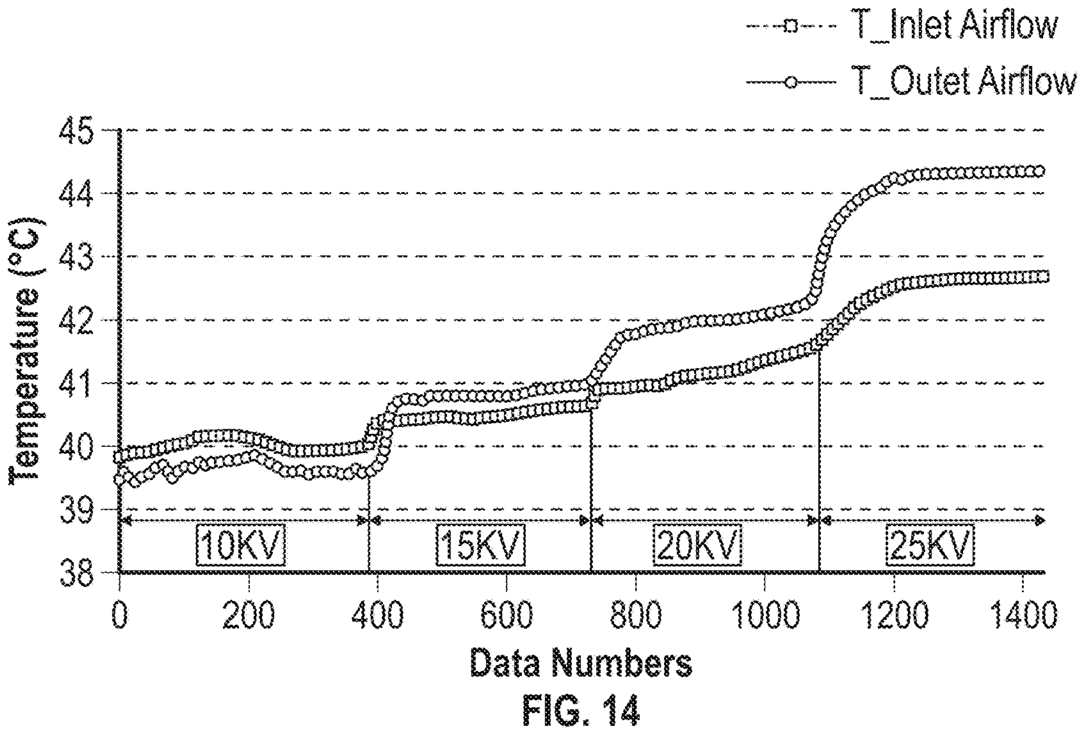

The decreasing trend is caused by the increasing outlet airflow temperature of the electrostatic separator resulting from heat released from the discharge electrode. As shown in FIG. 14, by increasing the applied voltage on the discharge electrode, airflow temperature of the inlet and outlet from the electrostatic separator increases and the latter starts to surpass the former when applied voltage reaches 15 kV. Compared with temperature changing across the electrostatic separator, the outlet airflow of the electrostatic separator rose dramatically leading to an evaporation loss caused by higher temperature.

Subsequent to using the electrostatic separator for collecting water particles from the exhaust airflow of a cooling tower directly, it was observed that the collection efficiency is very low mainly due to the fact that the molecular size of the gaseous state of water is so small that it is difficult to be charged and collected. Therefore, in order to collect water from water vapor, it is necessary to change the gaseous state of water vapor to its liquid state and shift the water particle size of water vapor to the size of mist or fog (2~15 μm). There are two ways for water vapor condensation, the first being to increase the pressure of water vapor and the second being to decrease the temperature of water vapor and provide a condensation nucleus. Water vapor is condensed to become bigger sized water droplets prior to entering into the electrostatic separator. The make-up water of cooling tower may be taken into consideration for the condensation process.

Figure 15:
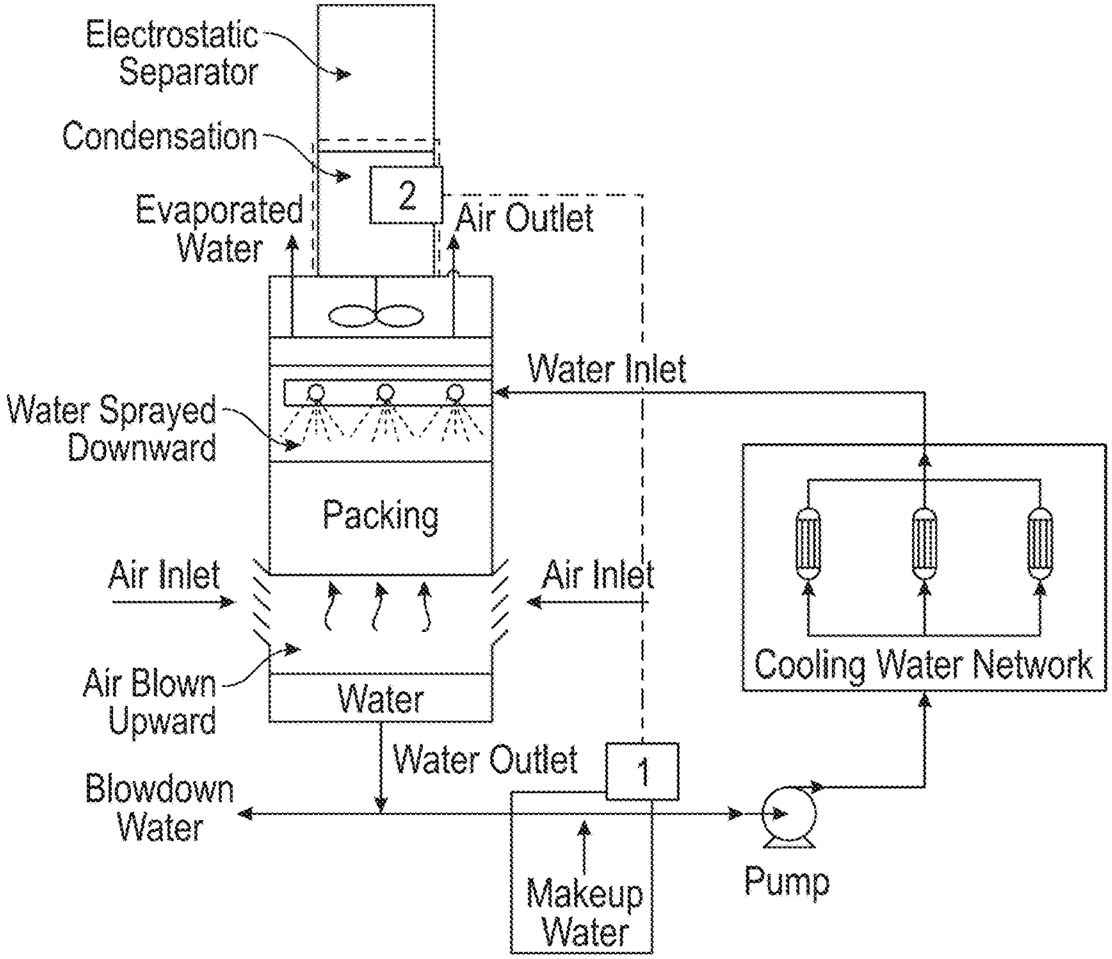
FIG. 15 shows a typical cooling water system

As pure water is evaporated, minerals are left behind in the recirculating water, and the water becomes more concentrated than the original make up water. This eventually leads to saturated conditions and decreases time of the circulating water cycle. Besides, drift loss and blow down also contribute to water loss of a cooling tower. Therefore, the cooling tower should be supplied by enough make-up water since the water level decreases by time during the operation. Usually, make-up water is added subsequent to water treatment of cooled water from the cooling tower, as shown in FIG. 15 at point 1, but is moved from point 1 to point 2, in order that the make-up water is sprayed by a nozzle producing fine mist which then provides a condensation surface for the water vapor.

Figure 16:
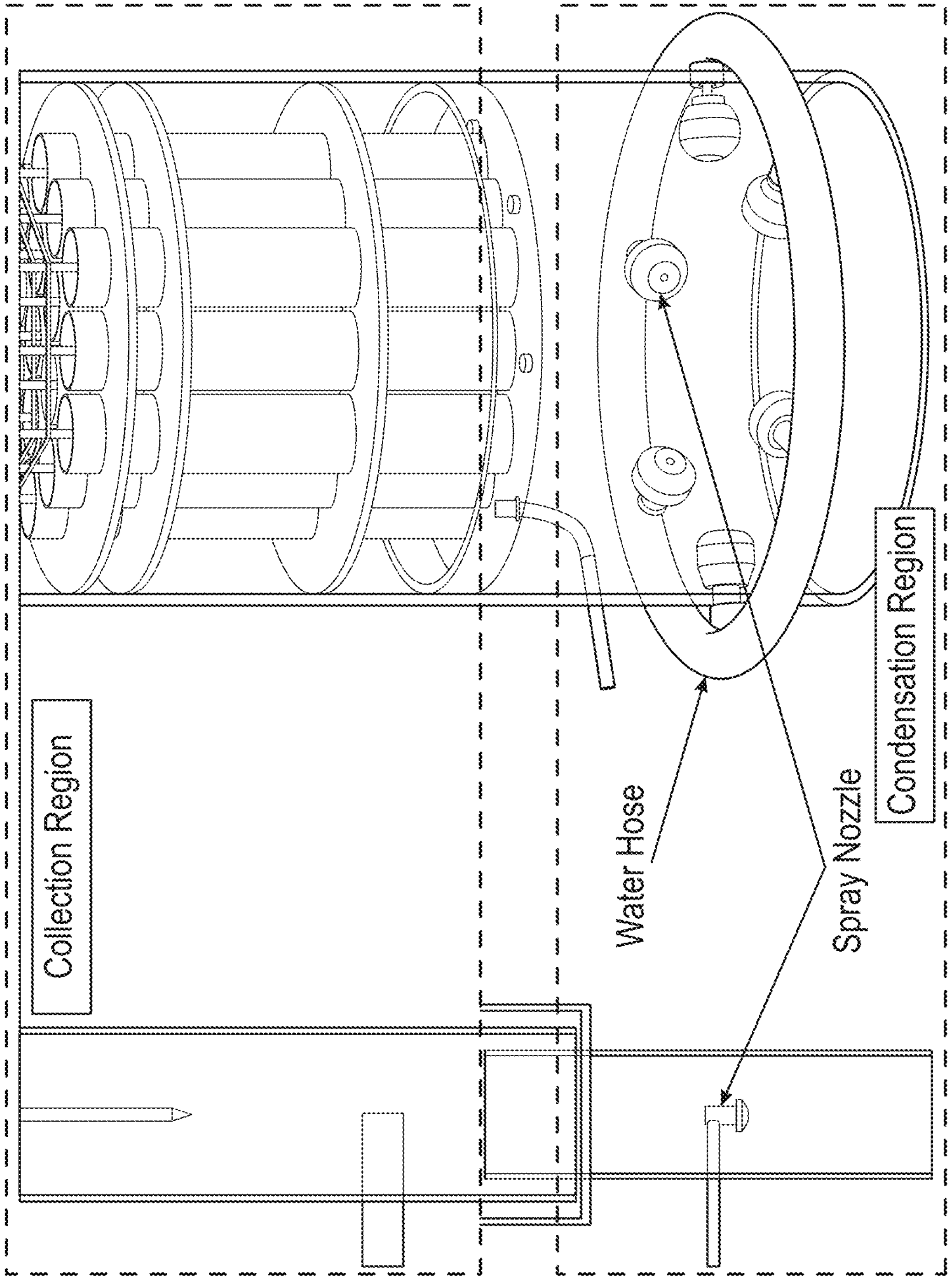
FIG. 16 is a schematic depiction of a water vapor condensation device for single unit and multi-unit electrostatic separators in accordance with the present invention

In accordance with the present invention, single and multiple spray nozzles are used for water vapor condensation in single-unit and multi-unit electrostatic separators, as shown in FIG. 16. The water droplets collection performance of an electrostatic separator for condensed water vapor from the cooling tower was investigated based on different parameters including applied voltage, airflow velocity and temperature. The parameters' range is shown in the following table.

| | |
|---|---|
| Applied Voltage (KV) (Negative Polarity) | ϕe = 0, 9.8, 11.5, 13, 15, 17.5, 20, 25, 28.4 |
| Airflow Temperature (° C.) | Tairflow = 25, 32, 37 |
| Airflow Velocity (m/s) | Vairflow = 0.5, 1.2, 1.8 |

Figure 17:
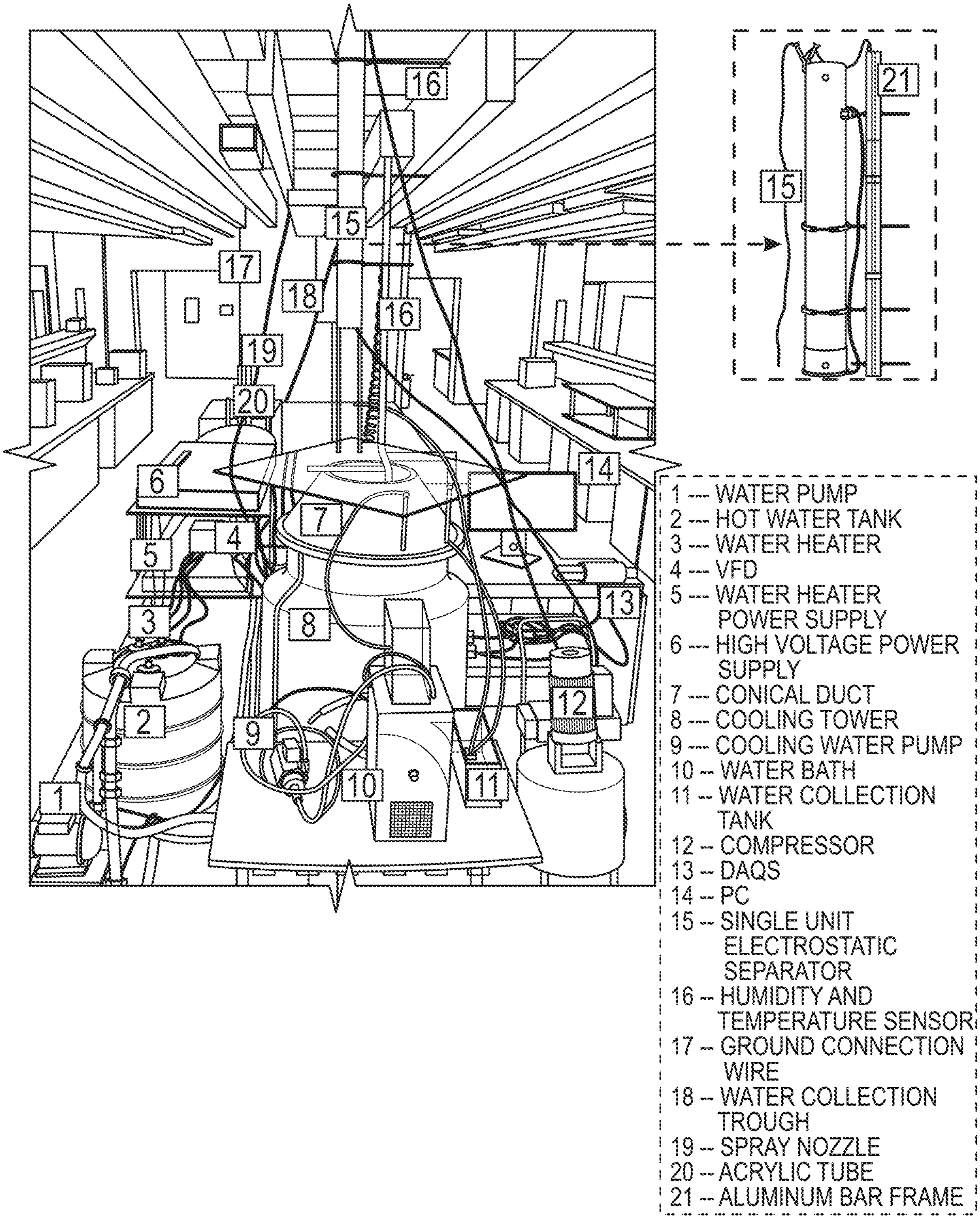
FIG. 17 shows an experimental setup of a water vapor collection by a single unit electrostatic separator in accordance with the present invention FIG. 18 graphically denotes the effect of airflow velocity on collection efficiency FIG. 19(*a*) graphically denotes relative humidity of inlet and outlet airflow FIG. 19(*b*) graphically denotes changing of inlet and outlet airflow temperature with different applied voltages FIG. 20 graphically denotes the effect of cooling water temperature on water droplets collection performance FIG. 21(*a*) shows the collector electrodes assembly of the electrostatic separator device in accordance with the present invention FIG. 21(*b*) shows the discharge electrodes assembly of the electrostatic separator device in accordance with the present invention FIG. 21(*c*) shows a seven unit electrostatic separator assembly in accordance with the present invention FIG. 22(*a*) shows the collector electrodes assembly of the electrostatic separator device in accordance with the present invention FIG. 22(*b*) shows the discharge electrodes assembly of the electrostatic separator device in accordance with the present invention FIG. 22(*c*) shows a nineteen unit electrostatic separator assembly in accordance with the present invention FIG. 23(*a*) displays water collection troughs for seven units electrostatic separators FIG. 23(*b*) displays water collection troughs for nineteen units electrostatic separators

The nozzle may be used to spray different temperature water for water vapor condensation, by changing the nozzle spraying direction from upward to downward. A single unit electrostatic separator is used and the experimental setup is shown in FIG. 17. The temperature of water in the hot water tank 2 is controlled by hard device water heaters 3 and software LabVIEW 14. The hot water is pumped into the cooling tower 8 by a water pump 1 and cooled water from the cooling tower is pumped back to the hot water tank 2 by another water pump. The water vapor comes out from the cooling tower 8 during evaporation cooling process, and enters into an acrylic tube 20 which is used for water vapor condensation by spraying water mist from the installed nozzle 19. The water bath 10 provides water at different temperature to the nozzle by the small water pump 9 and compressor 12. The water temperature in water bath can control the condensate quantity. Part of the water vapor condenses and combines with water mist from the nozzle, resulting in bigger sized water droplets and then going into the electrostatic separator 15. The charged water droplets then move to the collector electrode of the electrostatic separator and flow down to an annular water collection trough 18. The water then goes into a water collection tank 11 through a soft drainage hose. The relative mass ratio of collected water and consumed water, represented by equation (2), reflects the performance of water vapor collection by the electrostatic separator.

$$\zeta = |m_{collected} - m_{consumed}|/m_{consumed} \quad (2)$$

Figure 18:
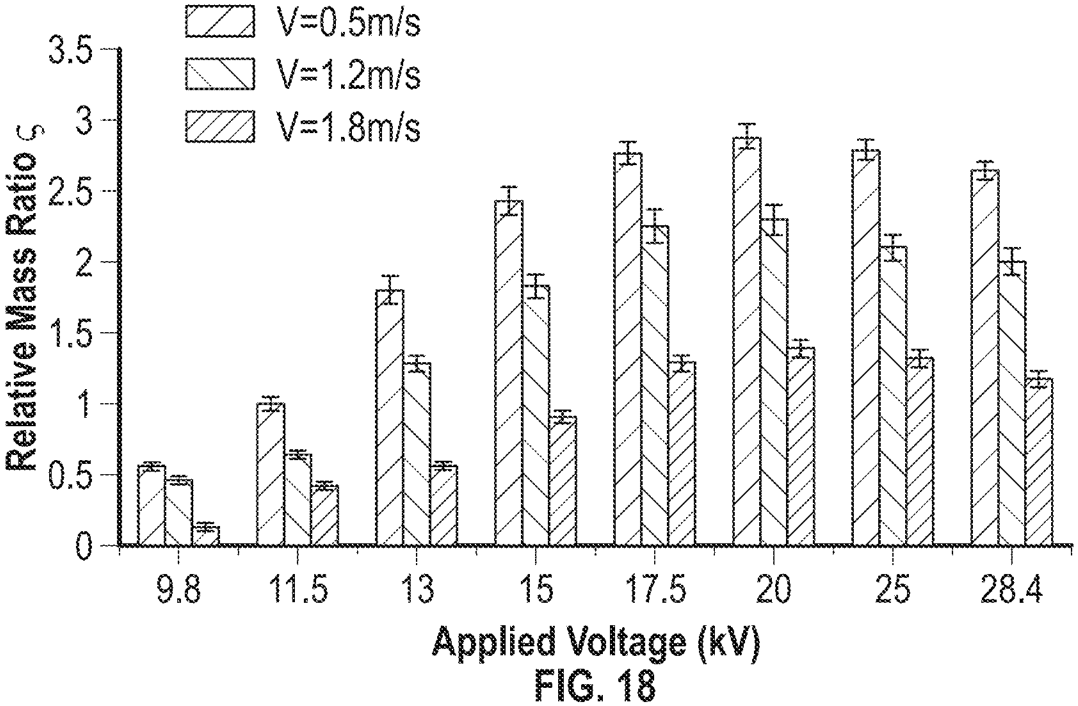

The temperature of water that is used to condense water vapour is 10° C. from the water bath, compressed air temperature is 23° C., and the initial inlet airflow temperature of electrostatic separator is 32° C. The results of the relative mass ratio of water droplet collection at different velocities are shown in FIG. 18. The total amount of collected water from the electrostatic separator is larger than the water consumed from the water bath in any condition. Hence, water mist from the nozzle resulted in water vapour condensing effectively.

Figure 19A:
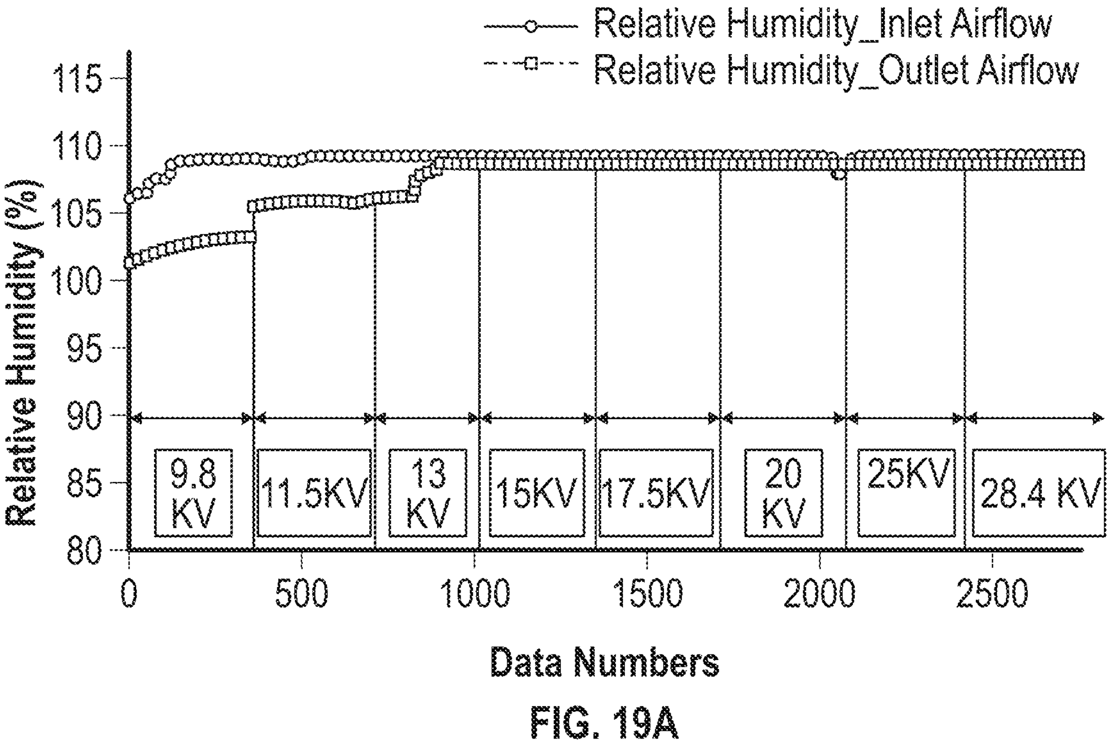
Figure 19B:
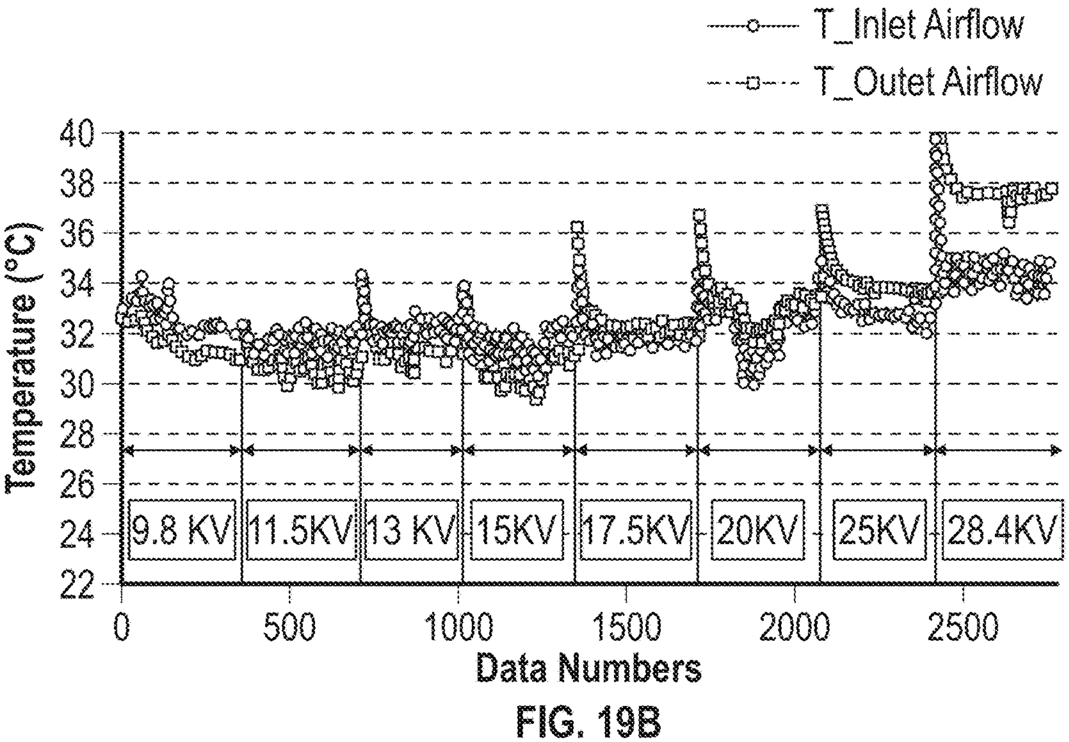

However, the data of relative humidity from the humidity sensor which was installed at the outlet of the electrostatic separator reveals that the nozzle cannot make all the water vapor coming into the electrostatic separator to condense thoroughly, because the relative humidity of outlet airflow is still large than 100%, as shown in FIG. 19(*a*). Compared to effect of airflow velocity on collection efficiency for the ultrasonic mist generator and nozzle, the relative mass ratio of water droplet collection decreased slightly when applied voltage reached 25 kV and 28.4 kV, because the temperature difference between the outlet airflow and inlet airflow is smaller than the previous experiment for ultrasonic mist generator and nozzle, as shown in FIG. 19(*b*).

In an embodiment of the present invention, the effect of airflow temperature on water droplets collection efficiency of electrostatic separator for cooling tower exhaust airflow was investigated. Studies were conducted at different temperatures: 300, 315 and 330 K. Results of the study show that the cooler the water is in the water bath, the more is collected water from the electrostatic separator. Stronger electric field contributes to higher water collection performance. Besides, the inlet water temperature of the cooling tower also decides the water collection performance by affecting the quantity of water vapor. Also, higher temperature circulating water may be used to replace cold water in the water bath. Inlet water of the cooling tower may also be used as a water source for the spray nozzle.

Figure 20:
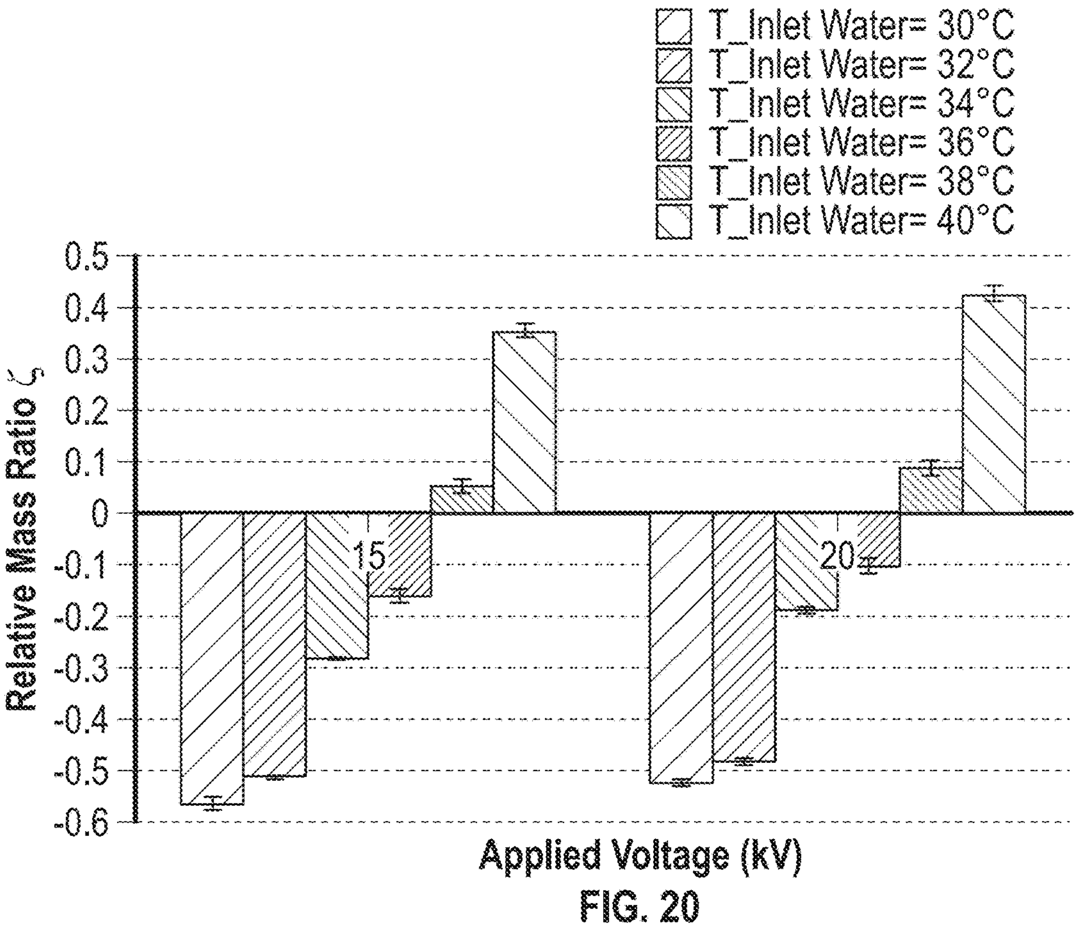

As shown in FIG. 20, with the increase of inlet water temperature of the cooling tower, the water droplets collection performance becomes better by using the same temperature water for water vapor condensation. But the amount of collected water from electrostatic separator is always less than that of consumed from water bath until the temperature of inlet water reach to 38° C. The results prove that the working circulation water may also be used to be sprayed from the nozzle to make water vapor condense to bigger size water droplets, and then collected by electrostatic separation.

Figure 21A:
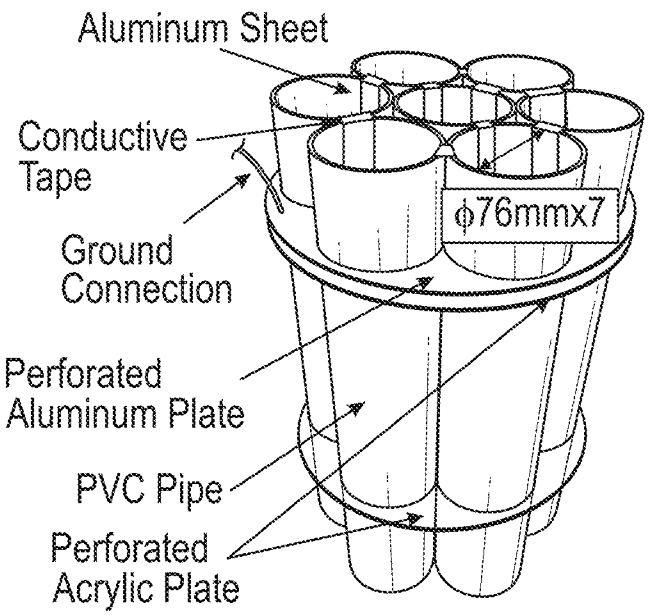
Figure 21B:
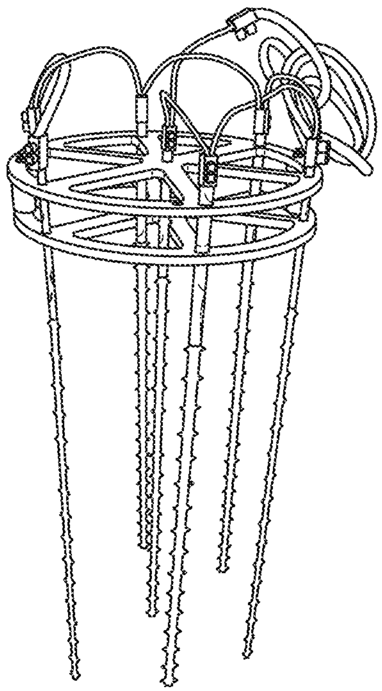
Figure 21C:
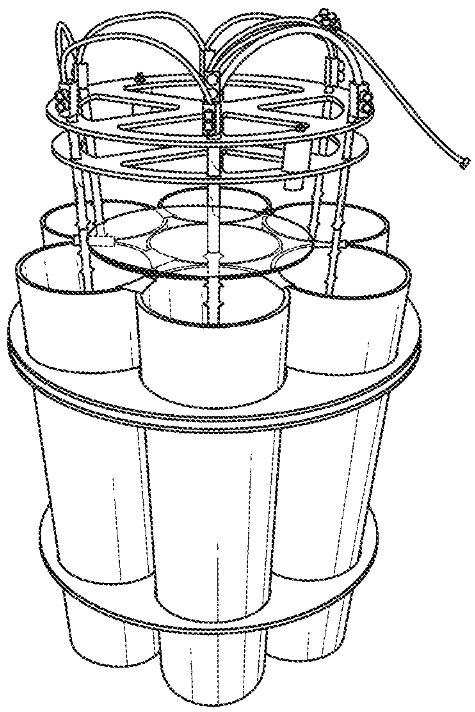
Figure 22A:
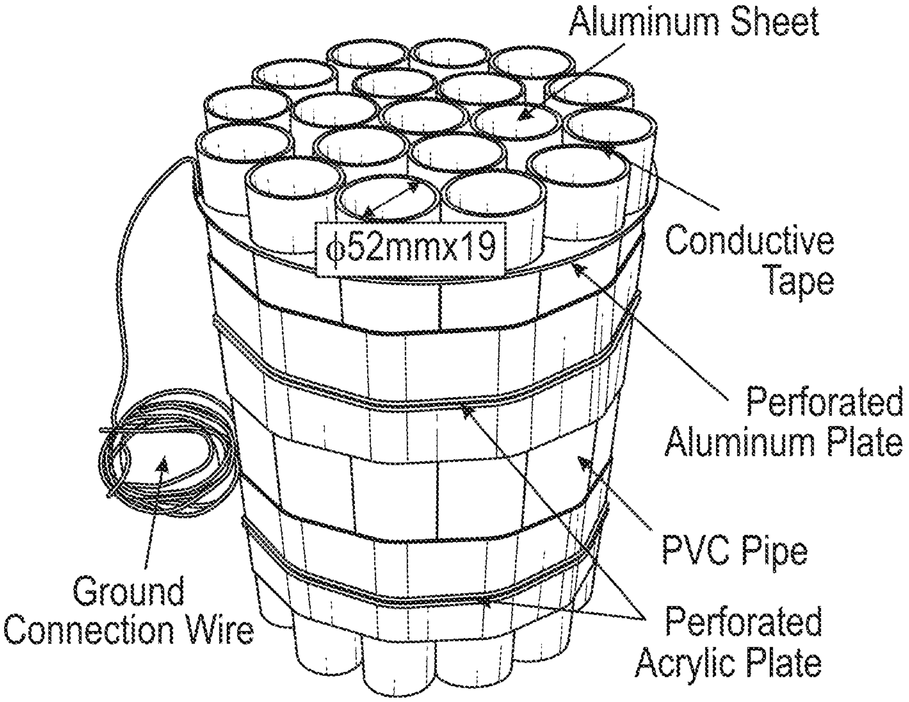
Figure 22B:
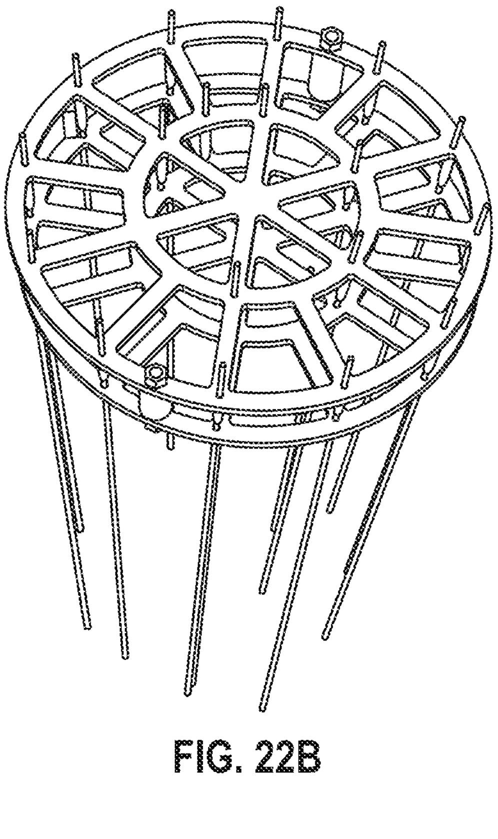
Figure 22C:
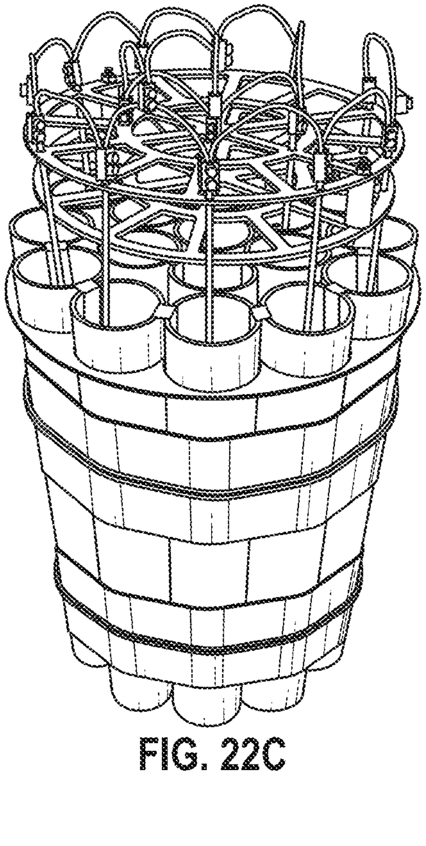

In accordance with another preferred embodiment of the present invention, a barbed plate multi-tubular geometry electrostatic separator is designed and fabricated. Two different diameter collector electrodes are used namely 76 mm and 52 mm Considering that the diameter of a multi-unit electrostatic separator is 290 mm, the number of collector electrodes in a large and small sized electrostatic separator are 7 and 19, respectively. A sub-electrostatic separator consists of one discharge electrode and a collector electrode. Two perforated acrylic plates are used to connect all collector electrodes together and an aluminum material perforated plate is used as the ground connection part, as shown in FIG. 21. Collector electrodes assembly of the electrostatic separator device is shown in FIG. 21(*a*), discharge electrodes assembly of the electrostatic separator device is shown in FIG. 21(*b*) and a seven units electrostatic separator assembly is shown in FIG. 21(*c*). Further, collector electrodes assembly of the electrostatic separator device is shown in FIG. 22(*a*), discharge electrodes assembly of the electrostatic separator device is shown in FIG. 22(*b*) and a nineteen units electrostatic separator assembly is shown in FIG. 22(*c*).

Figure 23A:
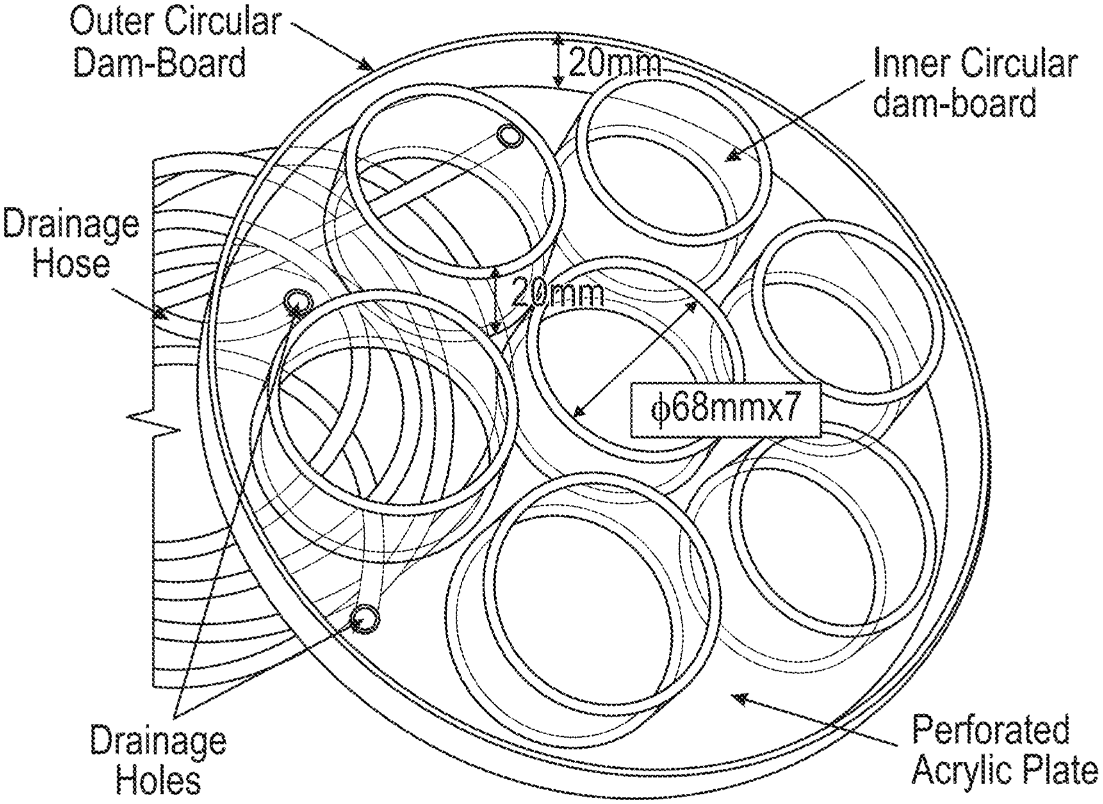
Figure 23B:
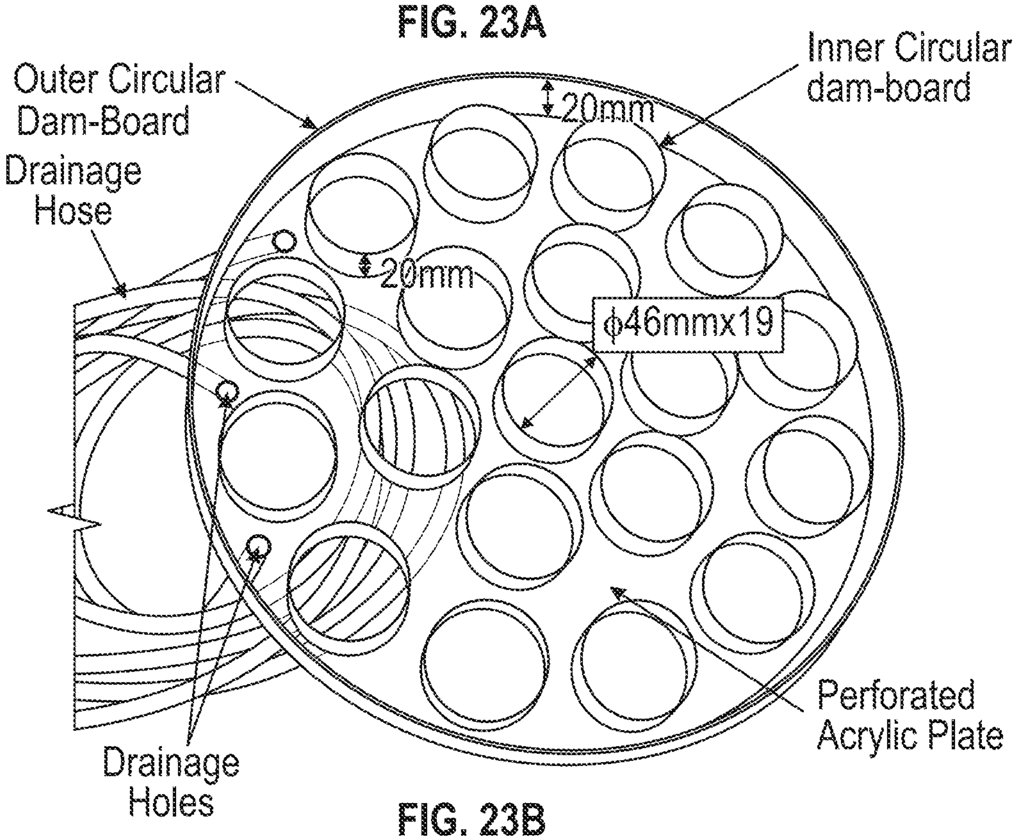

Once water particles are charged in the electric field, they move to the collector electrode forming water droplets and fall down along the wall of collector electrode. Therefore, a water tank is used to collect the water collected by the electrostatic separator. Because the electrostatic separator has multi-tubes, airflow must pass through the water tank without providing a higher pressure drop. Accordingly, the water tank is designed along with a perforated plate. The diameter of holes on the perforated plate is a little smaller than the diameter of the collector electrode, as shown in FIGS. 23(*a*) and (*b*). Additionally, there are also several small holes for the installation of drainage tubes. In accordance with another embodiment of the present invention, the manufactured collector electrodes unit, the discharge electrodes unit and water collection tank are assembled into a separator housing acrylic pipe. The outside diameter and length of the separator housing is 300 mm and 1200 mm, respectively. In order to keep the discharge electrodes from not touching the collector electrodes, an insulation fix device consisting of acrylic rods and acrylic plates is also designed and manufactured. Considering that humidity of the exhaust airflow is very high, selection of insulating materials for the collector electrodes is challenging.

Figure 24:
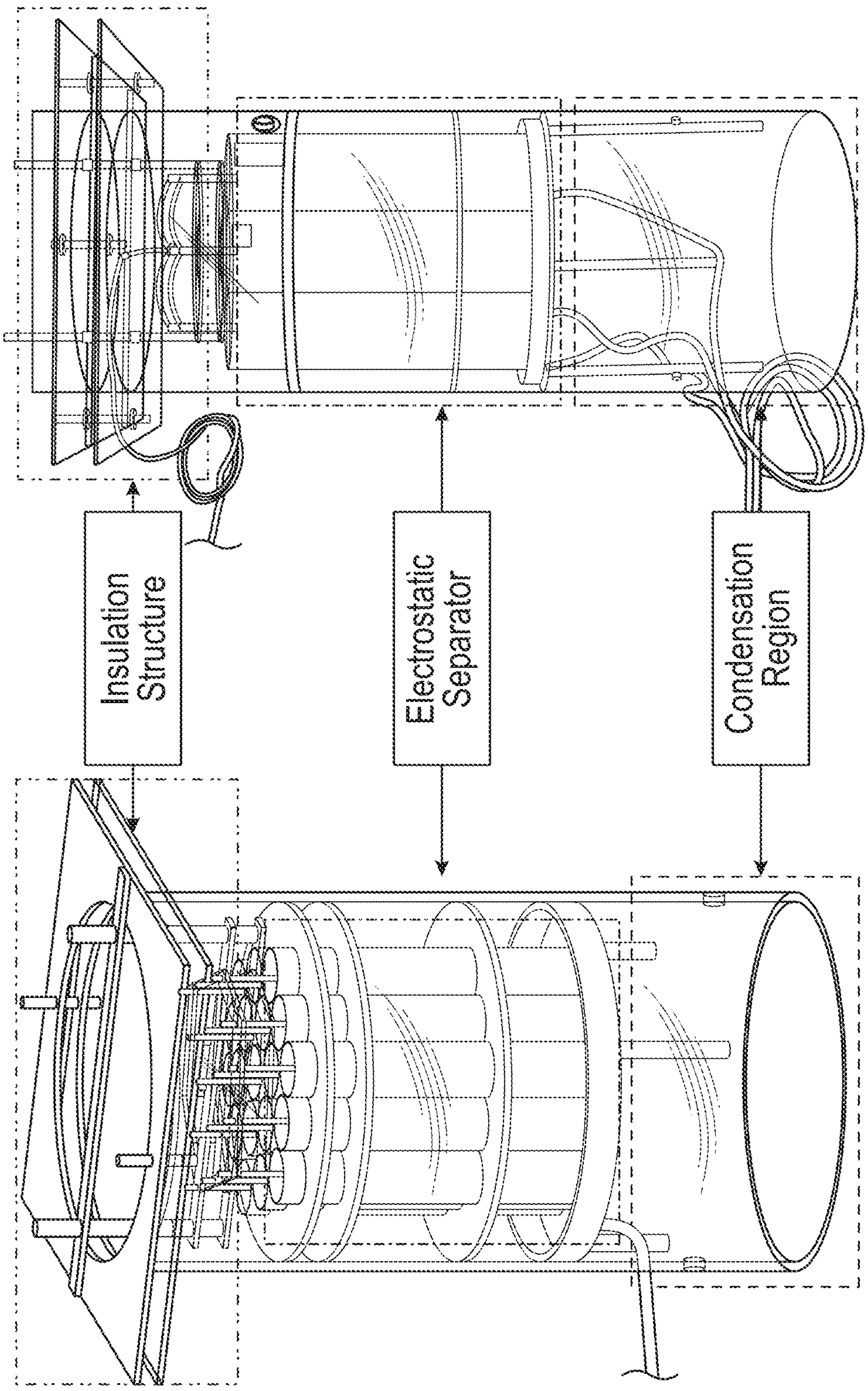
FIG. 24 is a 3D model and picture of a multi-unit electrostatic separator assembly
Figure 25:
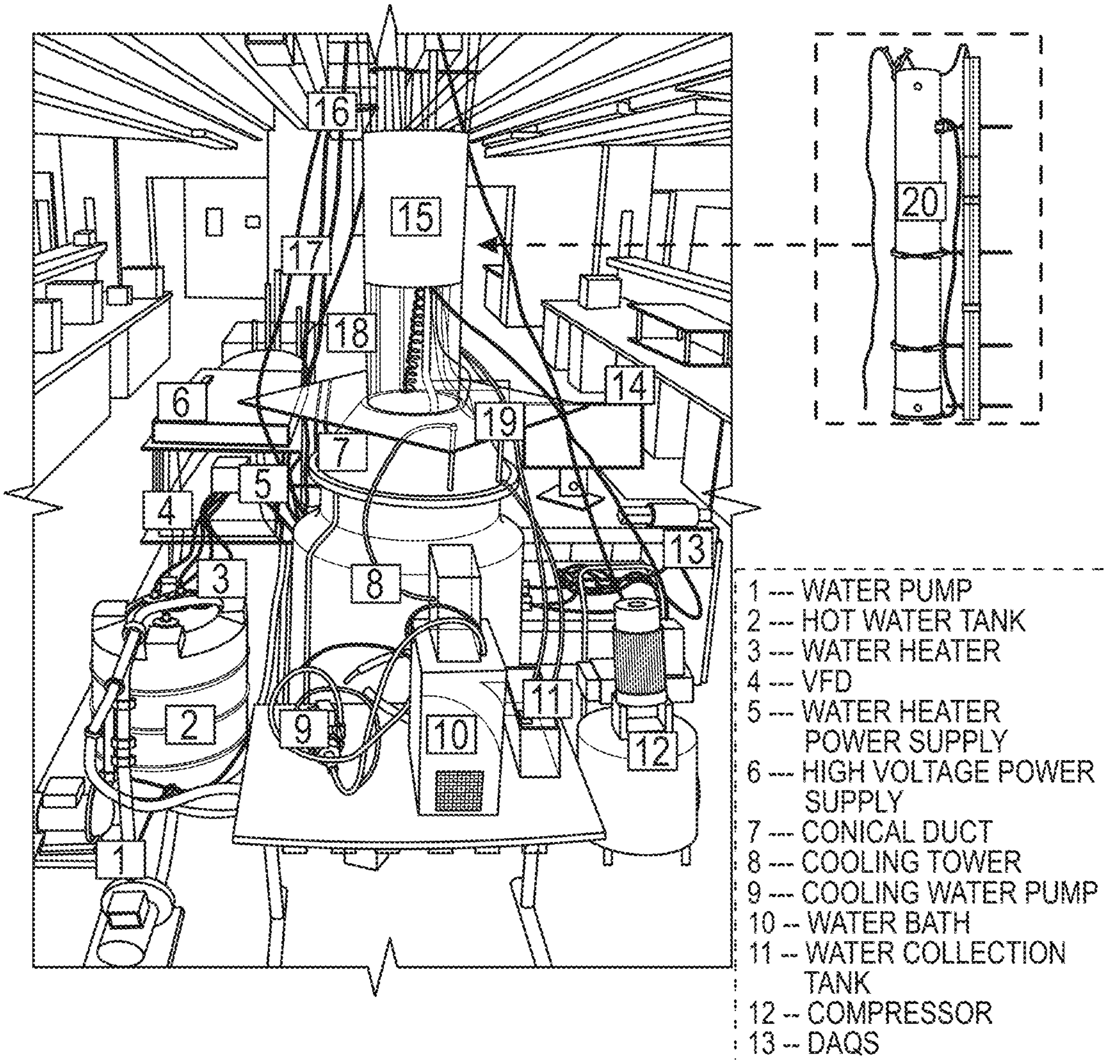
FIG. 25 shows a multi-unit electrostatic separator experimental setup in accordance with the present invention FIG. 26 graphically denotes the effect of electrostatic separator on cooling capacity of cooling tower FIG. 27(*a*) graphically denotes the effect of airflow velocity on water droplets collection performance of a multi-unit electrostatic separator FIG. 27(*b*) graphically denotes the effect of airflow velocity on water droplets collection performance of multi-unit electrostatic separator FIG. 28(*a*) shows an annular distribution of a multi-nozzle spraying system FIG. 28(*b*) shows a central concentrated arrangement of a multi-nozzle spraying system FIG. 28(*c*) shows multiple thin-walled hexagon tubes

Therefore, thread rods are used to adjust a position of the discharge electrodes in four directions. Beside, thread rods are also used to control an effective length of the electrostatic separator. FIG. 24 shows a 3D model and picture of multi-unit electrostatic separator assembly in accordance with the present invention. All the equipment and sensors of experimental setup for the multi-unit electrostatic separator are the same as that for a single unit electrostatic separator, the only difference being replacing the single unit electrostatic separator with the multi-unit electrostatic separator. FIG. 25 shows the multi-unit electrostatic separator experimental setup in accordance with the present invention.

Figure 26:
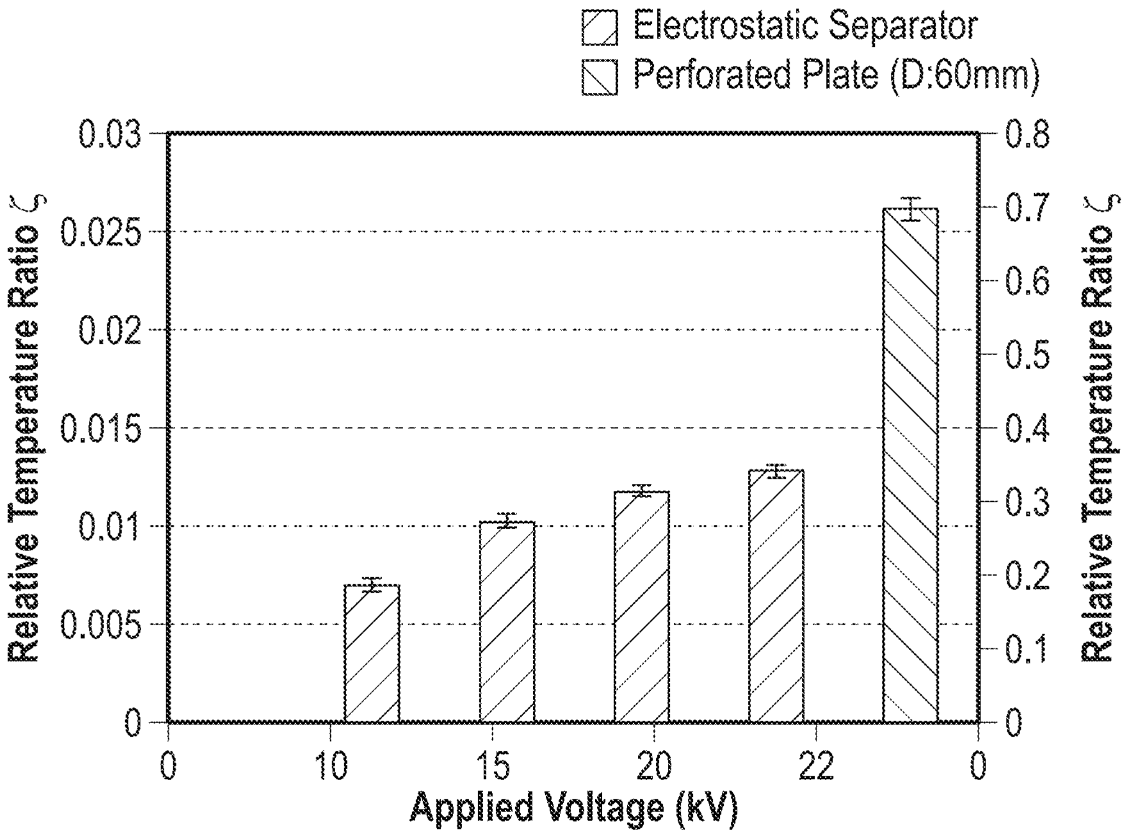

Since pressure drop across the outlet of the cooling tower will affect its cooling capacity, it is important to measure the pressure drop caused by the electrostatic separator which contributes to the total pressure drop. Considering the limitation of the length of the electrostatic separator and high turbulence produced by fan, a differential pressure transducer cannot work well for the pressure drop test. Therefore, an effective way is to compare the temperature difference between inlet water and outlet water from the cooling tower with and without the electrostatic separator working. Additionally, an experiment using perforated plates (with hole diameter 56 mm) in order to block the outlet of the cooling tower verifies that pressure drop decreases the cooling capacity of the cooling tower. The tested data, as shown in FIG. 26 is represented by equation (3). This is the ratio of the EHD force effect on the total pressure drop, since temperature difference between inlet and outlet water of the cooling tower reflects how the electrostatic separator affects pressure drop.

$$\zeta PD = |\Delta T\Phi e - \Delta T\Phi o|\Delta T\Phi o \quad (3)$$

As shown in FIG. 26, the pressure drop due to EHD force is a function of applied voltage, and the effect of electrostatic force on total pressure drop increased as applied voltage increased. However, when compared with the pressure drop caused by the perforated plate (red bar in FIG. 26), pressure drop due to the electrostatic separator may be neglected. Considering water droplets collection performance of the multi-unit electrostatic separator, water at 25° C. and 40° C. in the water bath is pumped separately to the nozzle (0.1 mm) for cooling the water vapor. The inlet water temperature is 40° C. The former experiment predicts using make-up water (tap water) to cause water vapor to condense, and the latter experiment tests the performance of using working circulation water to condense water vapor directly. The experiment results are shown in FIG. 27(*a*) and FIG. 27(*b*), respectively.

Figure 27A:
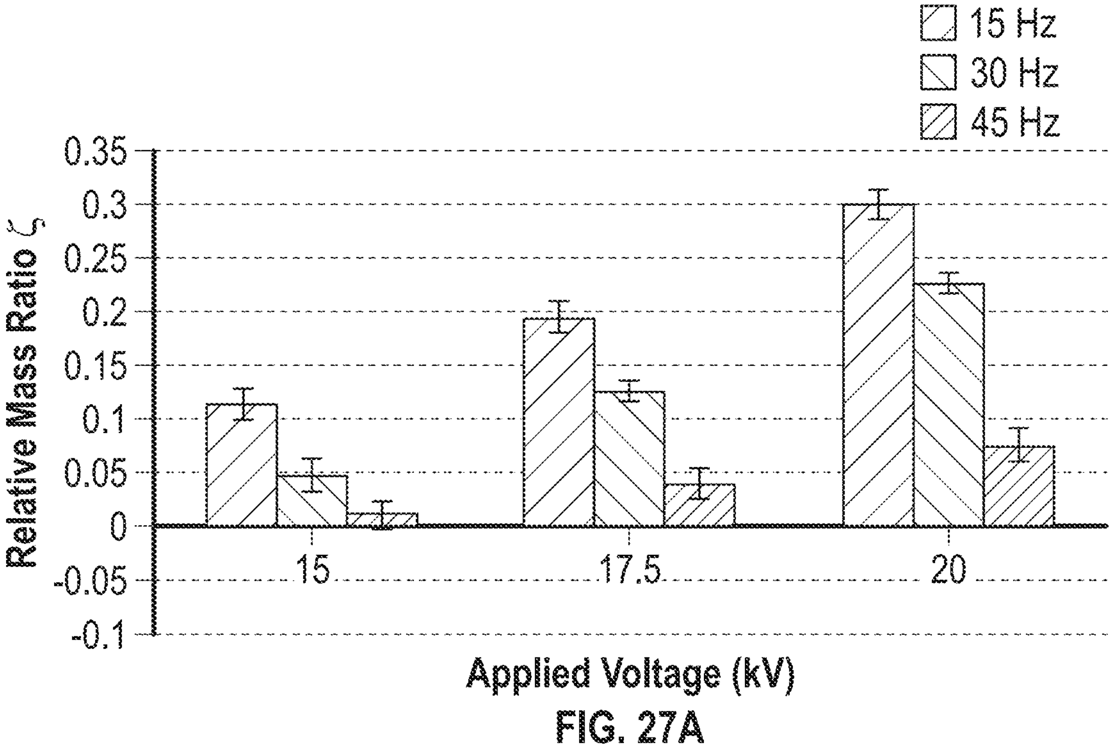
Figure 27B:
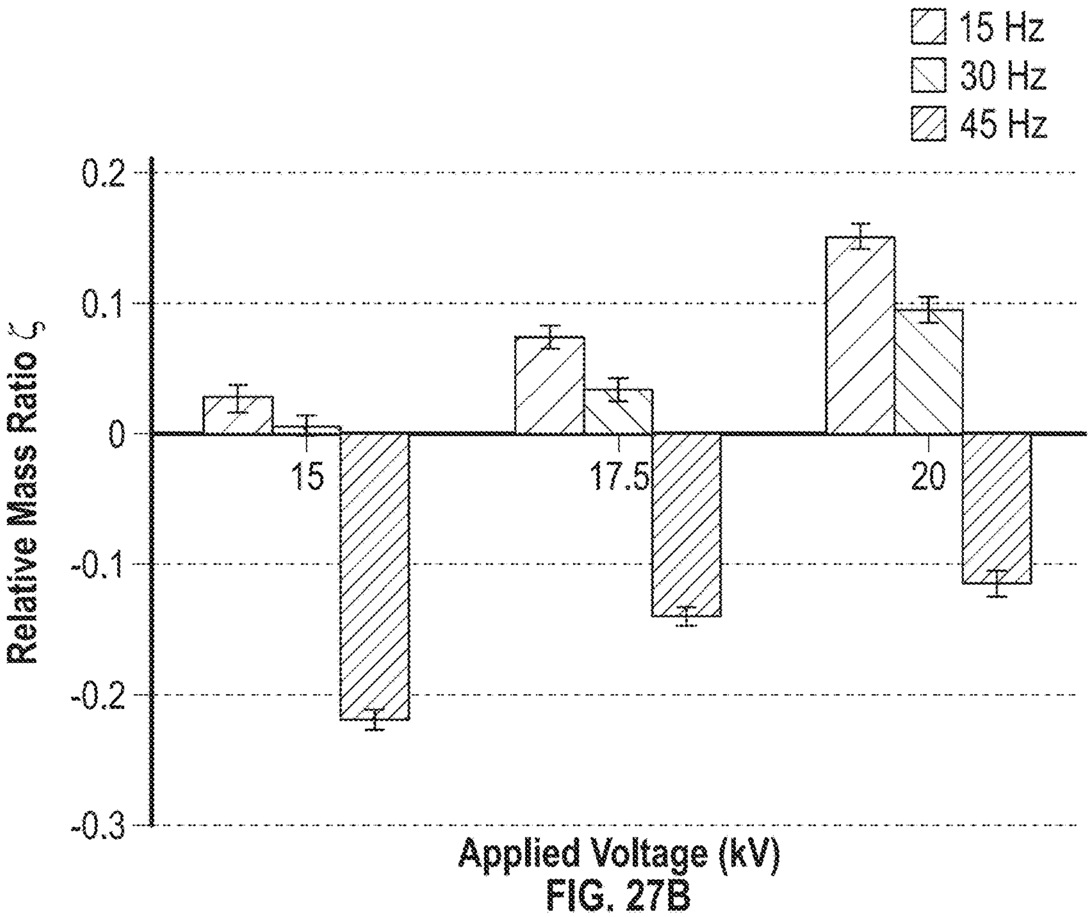

As shown in FIG. 27(*a*), the amount of collected water from the electrostatic separator is higher than the corresponding consumed water from the water bath in all cases. The collection efficiency decreased as airflow velocity increased, and water droplets collection efficiency is proportional to the value of applied voltage. However, compared to the results from the single unit electrostatic separator, the values of relative mass ratio from the multi-unit electrostatic decreased. One of the reasons being that the airflow was blocked by the area between multi-holes of the water collection trough, and part of the condensed water droplets were prevented from passing through the electrostatic separator. Another reason is that a single nozzle was used to spray water mist, making it overall difficult to cover the area of diameter of the multi-unit electrostatic separator, and most of water vapor passed through the multi-unit separator housing along the outside.

The results from FIG. 27(*b*) reveal that working circulation water is used to make water vapor condense effectively at a relatively lower airflow velocity (which is proved by results of cases wherein cooling tower fan frequencies are 15 Hz and 30 Hz). When the airflow velocity increased higher, the amount of collected water from electrostatic separator was less than the amount of water consumed from the water tank. The same factors, including a small spraying range and resistance from water collection trough, limited water vapor condensing quantity and water droplets collection efficiency of the electrostatic separator.

In accordance with the present invention, owing to the low water vapor collection efficiency for direct collection, water vapor condensation mechanism is proposed. The collection performance of condensed water vapor is studied by using single unit and multi-unit electrostatic separator based on different airflow velocities and temperatures. The electrostatic separator design is based on wire-tube geometry. An open test loop is constructed to test the separator performance and the effects of cooling water temperature and airflow speed were evaluated.

In accordance with an embodiment of the present invention, among the tested discharge electrodes, barbed plate discharge electrode has the best performance. Also, the intensity of electric field is inversely proportional to the diameter of collector electrode at same applied voltage. Exhaust airflow state from cooling tower was investigated. The exhaust airflow is always saturated or supersaturated so the relative humidity is large than 100 per cent, due to the water vapor, the main element of exhaust airflow, is gas state of water molecules so that it is difficult to be charged and collected by EHD approach.

In another embodiment, water droplets produced by an ultrasonic mist generator and nozzle was collected by using EHD approach and a parametric study of the effect of electric field and flow conditions on collection performance was conducted. Also, condensation approach was applied to make water vapor from cooling tower condense to become big size water droplets before entering into electrostatic separator. The amount of collected water was compared to that of the collected water from nozzle. Experimental study on the effect of parameters on water droplets collection efficiency reveals that collection efficiency reaches to maximum when applied voltage is at the range 17.5 kV to 20 kV for different state of airflow, the corresponding power consumption is from 6.1 W to 13.5 W. Besides, with the increase of airflow speed, the collection efficiency decreased because the high speed reduces the residual time of charged water droplets.

In another embodiment of the present invention, the multi-unit electrostatic separator is designed and manufactured, and its performance is tested by observing the collected water. The effect of electrostatic separator on cooling capacity of cooling tower is investigated, and the experiment results show that pressure drop caused by electrostatic separator is low, which does not reduce the cooling capacity. For saturated airflow, compared with airflow speed, applied voltage and temperature has a greater effect on the CVC curve of electric field. The applied voltage change of the emitter is proportional to generated current, while current decreases with increase in airflow temperature.

Figure 28A:
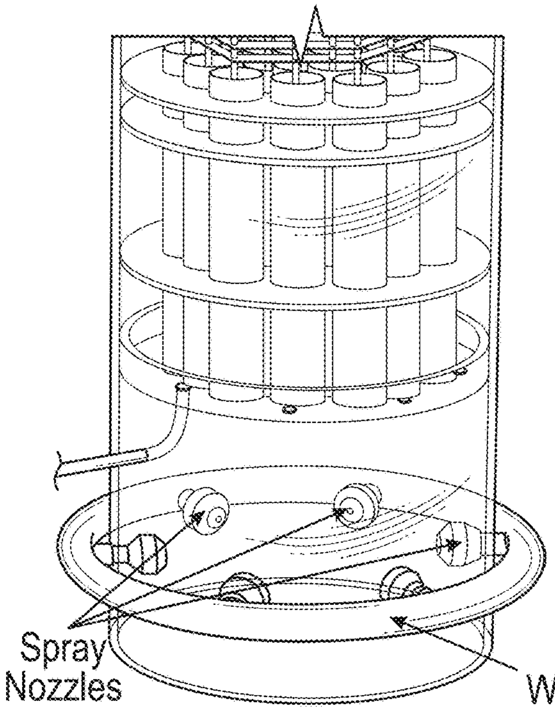
Figure 28B:
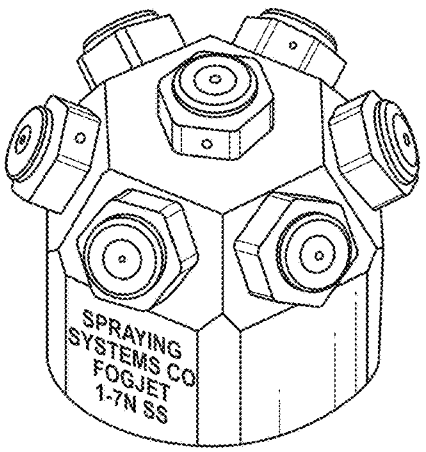
Figure 28C:
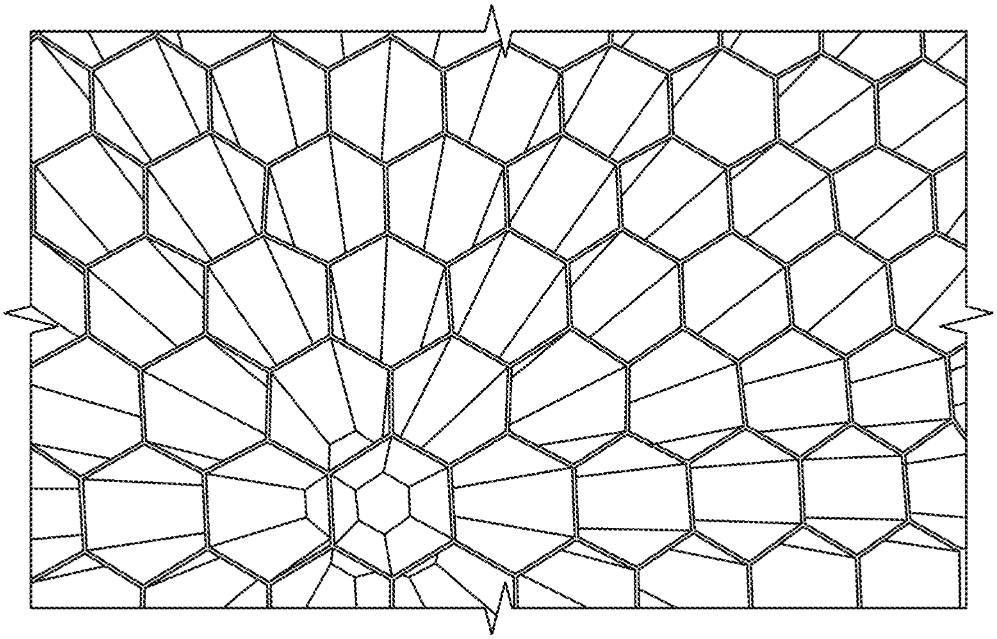

In another embodiment, a mass flow rate device may be used to solve problems such as errors caused by hand-made devices and sensors incapable of measuring airflow due to high turbulence and humidity. Further, in order to understand what factors result in low water droplets collection with high applied voltage, break-up model of charged droplets may be established and verified by experimental work. As shown in the annular distribution of FIG. 28(*a*) and central concentrated arrangement of FIG. 28(*b*), multiple spraying nozzles may be perpendicularly installed on the wall of electrostatic separator house to make water vapor from cooling tower condense thoroughly. Moreover, the multiple thin-walled hexagon tubes may be used as the collector electrode, as shown in FIG. 28(*c*), which may greatly reduce the pressure drop of the multi-unit electrostatic separator.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims which follow.

The invention claimed is:

1. A system for collecting water droplets from an airflow of a cooling tower through condensation of water vapor, the system comprising an electrostatic separator;

wherein the electrostatic separator is a single-unit electrostatic separator or a multi-unit electrostatic separator, and wherein the system for collecting water droplets from an airflow of a cooling tower further comprises:

a hot water tank;

water heaters to control a temperature of water within the hot water tank;

water pumps to pump cooled water back to the cooling tower;

an acrylic tube for water vapor condensation;

an annular water collection trough; and a water collection tank.

2. The system of claim 1, wherein the electrostatic separator comprises a collector electrode and a discharge electrode.

3. The system of claim 2, wherein the collector electrode is made of tubular metal or aluminum.

4. The system of claim 2, wherein the discharge electrode is made of iron.

5. The system of claim 2, wherein the discharge electrode comprises a number of sharp points on a cross-section of the discharge electrode.

6. The system of claim 2, wherein the discharge electrode comprises a barbed plate geometry.

7. The system of claim 2, wherein the discharge electrode comprises a symmetric barbed plate discharge electrode (SBPDE) or an asymmetric barbed plate discharge electrode (ASBPDE).

8. The system of claim 1, wherein single or multiple spray nozzles are used for producing water droplets for the single-unit electrostatic separator and the multi-unit electrostatic separator.

9. The system of claim 1, wherein a diameter of the multi-unit electrostatic separator is 290 mm, perforated acrylic plates are used to connect a plurality of collector electrodes together, and an aluminium perforated plate is used as a ground connection.

10. A process for preventing evaporative losses occurring from a cooling tower by collecting water droplets from an airflow of the cooling tower, the process comprising the steps of:

controlling a temperature of the airflow using a water bath;

setting a temperature for a component using a heat exchanger, the component including an ultrasonic mist generator or a nozzle;

heating tap water in a water tank using immersion heaters;

pumping the heated tap water into the cooling tower;

removing heat from the heated tap water through evaporation;

producing water vapor and drift using the component;

passing the produced water vapor and drift through a fan located on top of the cooling tower;

allowing the produced water vapor and drift to enter an electrostatic separator;

charging the produced water vapor and drift, wherein the produced water vapor and drift move towards a collector electrode due to an electric field force on passing through the electrostatic separator;

forming large water droplets on a wall of the collector electrode; and allowing the formed large water droplets to flow down to a collected water tank.

11. A method for water particles collection from an exhaust airflow of a cooling tower using a single unit or a multi-unit electrostatic separator, wherein the method comprises:

heating tap water in a water tank using immersion heaters;

pumping the heated tap water into the cooling tower;

removing heat from the heated tap water through evaporation;

producing water vapor and drift;

passing the produced water vapor and drift through a fan located on top of the cooling tower;

allowing the produced water vapor and drift to enter the electrostatic separator;

charging the produced water vapor and drift;

wherein the produced water vapor and drift move to a collector electrode and condense to form large water droplets on a wall of the collector electrode; and allowing the formed large water droplets to flow to a collector water tank.

12. The method of claim 11, wherein efficiency of water collection from the exhaust airflow of the cooling tower depends on a state and size of the water vapor and drift.

13. The method of claim 11, wherein efficiency of water collection is maximum when applied voltage is in a range of 17.5 kV to 20 kV, and corresponding power consumption is in a range of 6.1W to 13.5W.

* * * * *